United States Patent
Spannhake, II et al.

(10) Patent No.: US 12,333,395 B2
(45) Date of Patent: *Jun. 17, 2025

(54) SYSTEMS AND METHODS FOR COHORT-BASED PREDICTIONS IN CLUSTERED TIME-SERIES DATA IN ORDER TO DETECT SIGNIFICANT RATE-OF-CHANGE EVENTS

(71) Applicant: Citibank, N.A., New York, NY (US)

(72) Inventors: Ernst Wilhelm Spannhake, II, Canal Winchester, OH (US); Thomas Francis Gianelle, Colleyville, TX (US); Milan Shah, Plano, TX (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,829

(22) Filed: Jan. 8, 2024

(65) Prior Publication Data
US 2024/0202588 A1 Jun. 20, 2024

Related U.S. Application Data

(63) Continuation of application No. 18/174,498, filed on Feb. 24, 2023, now Pat. No. 11,868,860, which is a continuation-in-part of application No. 18/065,441, filed on Dec. 13, 2022, now Pat. No. 11,704,540.

(51) Int. Cl.
*G06N 20/00* (2019.01)
(52) U.S. Cl.
CPC .................................. *G06N 20/00* (2019.01)

(58) Field of Classification Search
CPC ...... G06N 3/0464; G06N 3/045; G06N 3/088; G06N 20/00
See application file for complete search history.

(56) References Cited

U.S. PATENT DOCUMENTS

| | | | |
|---|---|---|---|
| 11,704,540 B1 * | 7/2023 | Gianelle | G06N 3/0464 706/21 |
| 11,868,860 B1 * | 1/2024 | Spannhake, II | G06N 3/084 |
| 2014/0258254 A1 * | 9/2014 | Suleiman | G06F 16/34 707/703 |
| 2019/0147366 A1 * | 5/2019 | Sankaran | G06N 20/00 706/12 |

(Continued)

OTHER PUBLICATIONS

Hippenstiel, Ralph, Hassan El-Kishky, and Penio Radev. "On time-series analysis and signal classification—part I: fractal dimensions." Conference Record of the Thirty-Eighth Asilomar Conference on Signals, Systems and Computers, 2004.. vol. 2. IEEE, 2004: 2121-2125 (Year: 2004).*

(Continued)

*Primary Examiner* — Randall K. Baldwin
(74) *Attorney, Agent, or Firm* — Foley & Lardner LLP

(57) ABSTRACT

Systems and methods may use one or more artificial intelligence models that predict an effect of a predicted event on a current state of the system. The systems and methods may use one or more artificial intelligence models that predict an effect and/or occurrence of a predicted event based on the current state of the system. In order to generate responses that are both timely and pertinent (e.g., in a dynamic fashion), the system must determine, both quickly (i.e., in real-time or near real-time) and accurately, the predicted event.

20 Claims, 11 Drawing Sheets

(56) References Cited

U.S. PATENT DOCUMENTS

| | | | | |
|---|---|---|---|---|
| 2019/0171459 | A1* | 6/2019 | Nakagawa | G06F 11/3072 |
| 2020/0012902 | A1* | 1/2020 | Walters | G06F 16/285 |
| 2020/0257943 | A1* | 8/2020 | Huber | G06F 16/907 |
| 2020/0302296 | A1* | 9/2020 | Miller | G06N 20/20 |
| 2020/0334635 | A1* | 10/2020 | Busey | G06N 5/04 |
| 2020/0337648 | A1* | 10/2020 | Saripalli | G06N 20/00 |
| 2021/0049700 | A1* | 2/2021 | Nguyen | G06N 3/044 |
| 2021/0081759 | A1* | 3/2021 | Zhao | G06Q 20/127 |
| 2021/0248503 | A1* | 8/2021 | Hickey | G06F 18/2113 |
| 2021/0256378 | A1* | 8/2021 | Watt | G06N 3/044 |
| 2021/0397938 | A1* | 12/2021 | Tora | G06F 16/904 |
| 2022/0292308 | A1* | 9/2022 | Schwiep | G06F 18/2163 |
| 2022/0366494 | A1* | 11/2022 | Cella | H04L 9/50 |
| 2023/0164035 | A1* | 5/2023 | Nagar | G06N 3/088 714/37 |
| 2023/0306284 | A1* | 9/2023 | Tappin | G06F 16/248 |

OTHER PUBLICATIONS

Wang, Xiaozhe, Kate Smith, and Rob Hyndman. "Characteristic-based clustering for time series data." Data mining and knowledge Discovery 13 (2006): 335-364 (Year: 2006).*

Lu, Weining, et al. "Unsupervised sequential outlier detection with deep architectures." IEEE transactions on image processing 26.9 (2017): 4321-4330. (Year: 2017).*

Vargas, Manuel R., et al. "Deep learning for stock market prediction using technical indicators and financial news articles." 2018 international joint conference on neural networks (IJCNN). IEEE, 2018. (Year: 2018).*

Sezer, Omer Berat, and Ahmet Murat Ozbayoglu. "Algorithmic financial trading with deep convolutional neural networks: Time series to image conversion approach." Applied Soft Computing 70 (2018): 525-538. (Year: 2018).*

Sezer, Omer Berat, and Ahmet Murat Ozbayoglu. "Financial trading model with stock bar chart image time series with deep convolutional neural networks." arXiv preprint arXiv:1903.04610 (2019): 1-15 (Year: 2019).*

Rivera-Castro, Rodrigo, et al. "Topology-based clusterwise regression for user segmentation and demand forecasting." 2019 IEEE International Conference on Data Science and Advanced Analytics (DSAA). IEEE, 2019: 326-336 (Year: 2019).*

Tovar, Wilfredo. "Deep Learning Based on Generative Adversarial and Convolutional Neural Networks for Financial Time Series Predictions." arXiv preprint arXiv:2008.08041 (2020). (Year: 2020).*

Pletnev, Aleksandr, Rodrigo Rivera-Castro, and Evgeny Burnaev. "Graph neural networks for model recommendation using time series data." 2020 19th IEEE International Conference on Machine Learning and Applications (ICMLA). IEEE, 2020. (Year: 2020).*

Sridhar, Sashank, and Sowmya Sanagavarapu. "Effect of Rate of Change of Stock Prices with News Sentiment Analysis." 2021 18th International Conference on Electrical Engineering, Computing Science and Automatic Control (CCE). IEEE, 2021. (Year: 2021).*

Zhuzhel, Vladislav, et al. "COHORTNEY: Non-Parametric Clustering of Event Sequences." arXiv preprint arXiv:2104.01440 (2021). (Year: 2021).*

Rimal, Binod. Financial Time-Series Analysis with Deep Neural Networks. Diss. Florida Atlantic University, Aug. 2022: i-139 (Year: 2022).*

Liu, Ya, et al. "Unsupervised Deep Learning for IoT Time Series." arXiv preprint arXiv:2302.03284 (Feb. 21, 2023): 1-22 (Year: 2023).*

Di Martino, Flavio, and Franca Delmastro. "Explainable AI for clinical and remote health applications: a survey on tabular and time series data." Artificial Intelligence Review 56.6 (2023): 5261-5315. (Year: 2023).*

Aleksandr Pletnev et al., "Graph Neural Networks for Model Recommendation using Time Series Data," 2020 19th IEEE International Conference on Machine Learning and Applications (ICMLA), IEEE, 2020 (Year: 2020).

Binod Rimal, "Financial Time-Series Analysis with Deep Neural Networks," Diss. Florida Atlantic University, Aug. 2022: i-139 (Year: 2022).

Deepika Nalabala et al., "Financial Predictions based on Fusion Models-a Systematic Review," 2021 International Conference on Emerging Smart Computing and Informatics (ESCI), IEEE, 2021: 28-37 (Year: 2021).

Manual R. Vargas et al., "Deep Learning for Stock Market Prediction using Technical Indicators and Financial News Articles," 2018 International joint conference on neural networks (IJCNN), IEEE, 2018 (Year: 2018).

Omer Berat Sezer et al., "Algorithmic Financial Trading with Deep Convolutional Neural Networks: Time Series to Image Conversion Approach," Applied Soft Computing 70 (2018): 525-538. (Year: 2018).

Omer Berat Sezer et al., "Financial Trading Model with Stock Bar Chart Image Time Series with Deep Convolutional Neural Networks," arXiv preprint arXiv:1903.04610 (2019): 1-15 (Year: 2019).

Ralph Hippenstiel et al., "On time-series analysis and signal classification—part I: Fractal Dimensions," Conference Record of the Thirty-Eighth Asilomar Conference on Signals, Systems and Computers, 2004, vol. 2, IEEE, 2004: 2121-2125 (Year: 2004).

Rodrigo Rivera-Castro et al., "Topology-based Clusterwise Regression for User Segmentation and Demand Forecasting," 2019 IEEE International Conference on Data Science and Advanced Analytics (DSAA), IEEE, 2019: 326-336 (Year: 2019).

Sashank Sridhar et al., "Effect of Rate of Change of Stock Prices with News Sentiment Analysis," 2021 18th International Conference on Electrical Engineering, Computing Science and Automatic Control (CCE), Nov. 12, 2021.

Vladislav Zhuzhel et al., "COHORTNEY: Non-Parametric Clustering of Event Sequences," arXiv preprint arXiv:2104.01440 (2021) (Year: 2021).

Weining Lu et al., "Unsupervised Sequential Outlier Detection with Deep Architectures," IEEE transactions on image processing 26.9 (2017): 4321-4330 (Year: 2017).

Wilfredo Tovar Hildago, "Deep Learning Based on Generative Adversarial and Convolutional Neural Networks for Financial Time Series Predictions," arXiv preprint arXiv:2008.08041 (2020) (Year: 2010).

Xiaozhe Wang et al., "Characteristic-based Clustering for Time Series Data," Data Mining and Knowledge Discovery 13 (2006): 335-364 (Year: 2006).

Ya Liu et al., "Unsupervised Deep Learning for IoT Time Series," arXiv preprint arXiv:2302.03284 (Feb. 21, 2023): 1-22 (Year: 2023).

* cited by examiner

SYSTEMS AND METHODS FOR COHORT-BASED PREDICTIONS IN CLUSTERED TIME-SERIES DATA IN ORDER TO DETECT SIGNIFICANT RATE-OF-CHANGE EVENTS

CROSS-REFERENCE TO RELATED APPLICATIONS

This application is a continuation of U.S. Pat. No. 11,868,860, filed Feb. 24, 2023, which is a continuation-in-part of U.S. Pat. No. 11,704,540, filed Dec. 13, 2022. The content of the foregoing applications is incorporated herein in its entirety by reference.

This application is further related to U.S. Patent Application Pub. No. 2024/0193165, filed Jul. 18, 2023, which is a continuation-in-part of U.S. patent application Ser. No. 11,868,860, filed Feb. 24, 2023. The content of the foregoing applications is incorporated herein in its entirety by reference.

BACKGROUND

Artificial intelligence, including, but not limited to, machine learning, deep learning, etc. (referred to collectively herein as artificial intelligence models, machine learning models, or simply models) has excited the imaginations of both industry enthusiasts as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. Artificial intelligence typically relies on training a model to make predictions and/or perform functions. Such training requires large amounts of high-quality data through which patterns may be detected. The process for obtaining this data and ensuring it is high-quality is often complex and time-consuming. Furthermore, as artificial intelligence is applied to new applications, there may not be any prior data or patterns (or at least those that are recorded) upon which to base training data.

SUMMARY

Systems and methods are described herein for novel uses and/or improvements to artificial intelligence applications, specifically applications related to predicting events in time-series data. As one example, methods and systems are described herein for predicting events in time-series data and modifying one or more characteristics of a current state accordingly. For example, the systems and methods may detect significant events (e.g., identify and measure events that correspond to rates-of-change in time-series data beyond a contextually relevant common threshold). Based on these predictions, the system may provide recommendations for changes in current characteristics of the state that may mitigate or take advantage of the effects of these predicted events (e.g., provide recommended changes to current characteristics in order to mitigate predicted rates-of-change over a first time period in the first time-series data). Furthermore, these recommendations may be based on non-obvious positive and negative events that are time-based and contextually relevant to a given individual/entity.

To achieve these predictions, the systems and methods may use one or more artificial intelligence models that predict an effect and/or occurrence of a predicted event based on the current state of the system. In order to generate responses that are both timely and pertinent (e.g., in a dynamic fashion), the system must determine both quickly (i.e., in real-time or near real-time) and accurately the predicted event. However, making such determinations faces an initial technical hurdle; while the determination must be made quickly and accurately, the system may have little information available to distinguish a positive detection from a false-positive determination. Moreover, the information available may be similar or the same for most categories of information.

In order to overcome the technical issues of only a little, incomplete, and/or inconclusive data being available, the system uses a two-tier approach in which the system first determines a likely cohort of users that may indicate the most likely categories of information (e.g., similar state characteristics) that are relevant for a given prediction for users of that cohort. The system then determines based on a model trained specifically for those state characteristics whether or not a predicted event (and/or a magnitude of the predicted event) is likely to occur. For example, the methods and systems may include a first artificial intelligence model, wherein the first artificial intelligence model is trained to cluster a plurality of separate time-series data streams into a plurality of cohort clusters through unsupervised hierarchical clustering. The methods and systems may also use a second artificial intelligence model, wherein the second artificial intelligence model is trained to select a subset of the plurality of cohort clusters from the plurality of cohort clusters based on a first feature input, and wherein each cohort cluster of the plurality of cohort clusters corresponds to a respective cohort of users having similar current state characteristics.

In some aspects, systems and methods are described herein for using cohort-based predictions in clustered time-series data in order to detect significant rate-of-change events. For example, the system may receive a first user profile, wherein the user profile comprises a current state characteristic. The system may, in response to receiving the first user profile, determine a first feature input based on the first user profile. The system may retrieve a plurality of cohort clusters, wherein the plurality of cohort clusters is generated by a first artificial intelligence model that is trained to cluster a plurality of separate time-series data streams into the plurality of cohort clusters. The system may input the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having similar current state characteristics. The system may receive an output from the second artificial intelligence model. The system may select, based on the output, a time-series prediction from a plurality of time-series predictions, wherein each of the plurality of time-series predictions comprises a respective predicted event, and wherein each cohort cluster of the subset of the plurality of cohort clusters corresponds to a respective time-series prediction of the plurality of time-series predictions. The system may generate, at a user interface, the time-series prediction.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

Figure 3A:
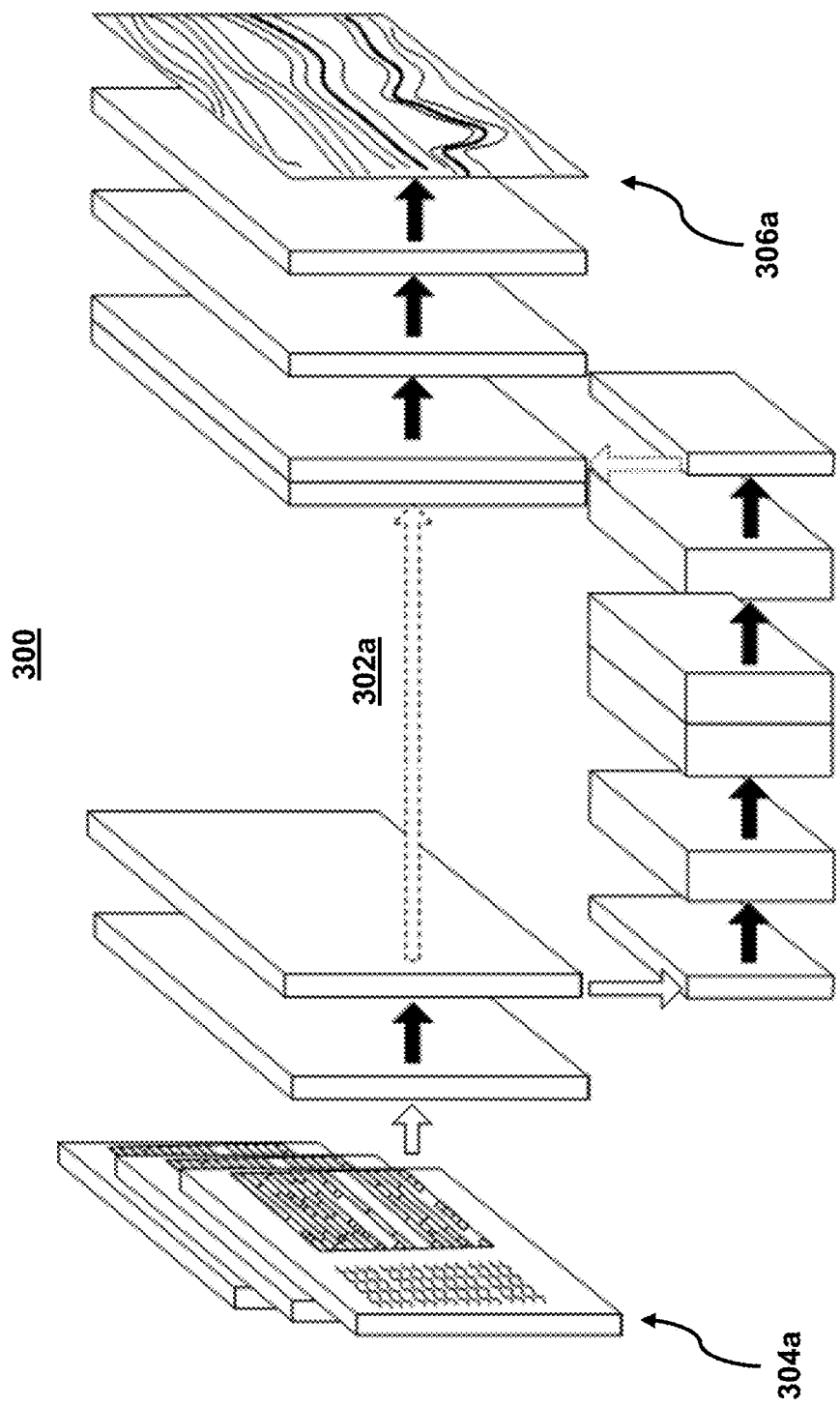
Figure 3B:
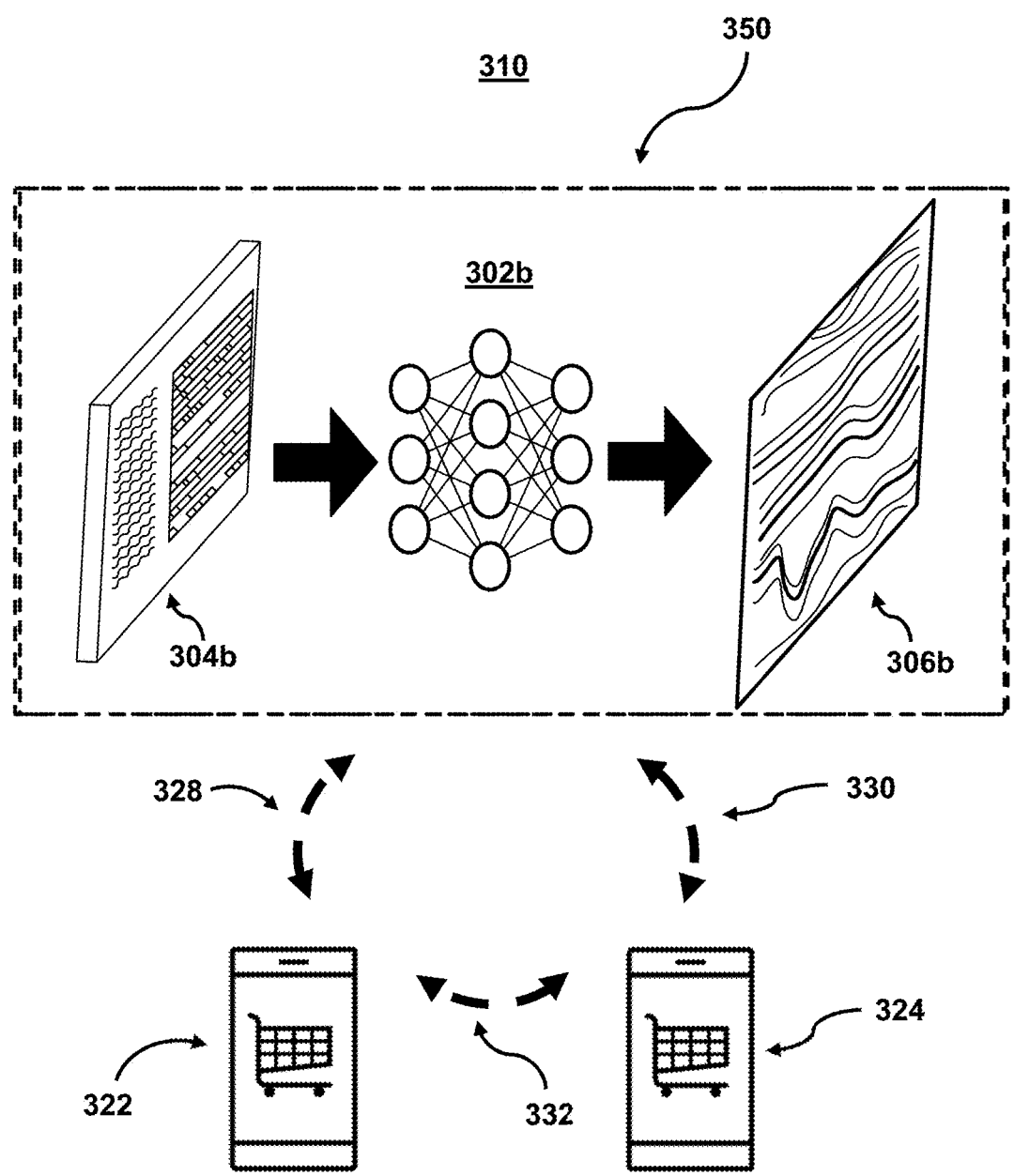

FIGS. 3A-B show illustrative models for a system used to generate recommendations based on a synthetic profile, in accordance with one or more embodiments.

Figure 4:
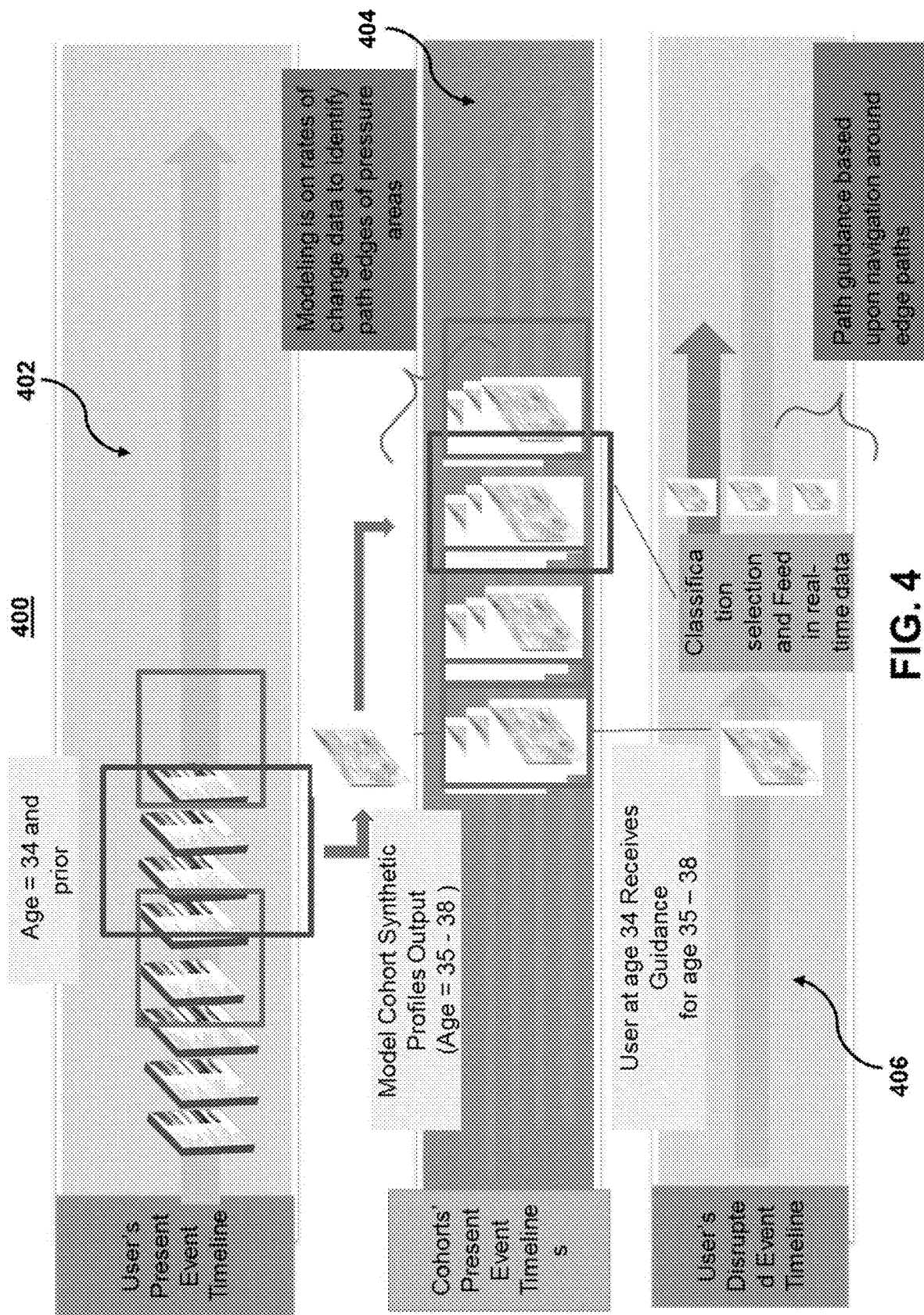

FIG. 4 shows a diagram for creating synthetic profiles, in accordance with one or more embodiments.

Figure 5:
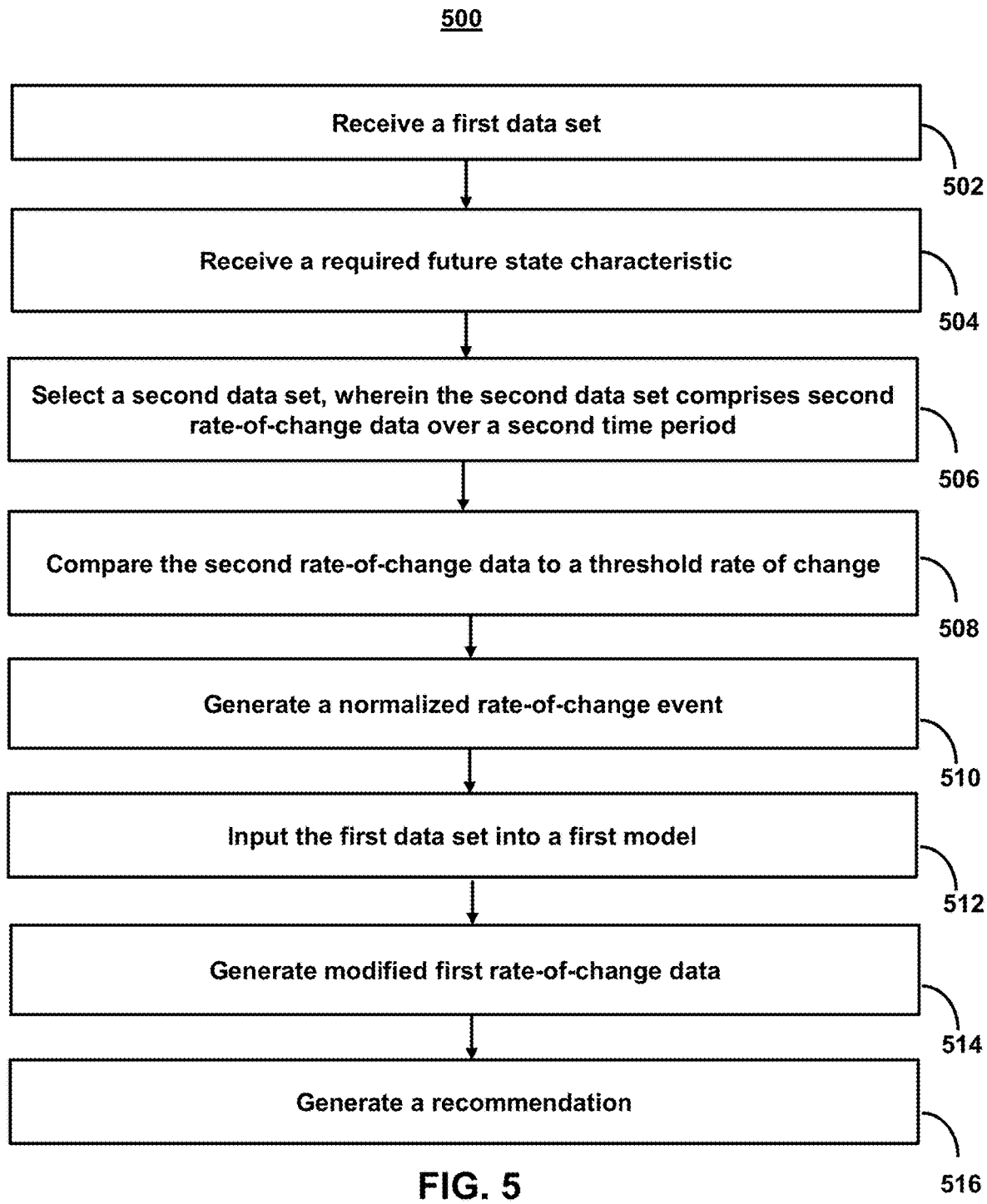

FIG. 5 shows a flowchart of the steps involved in responding to predicted events in computer systems, in accordance with one or more embodiments.

Figure 6:
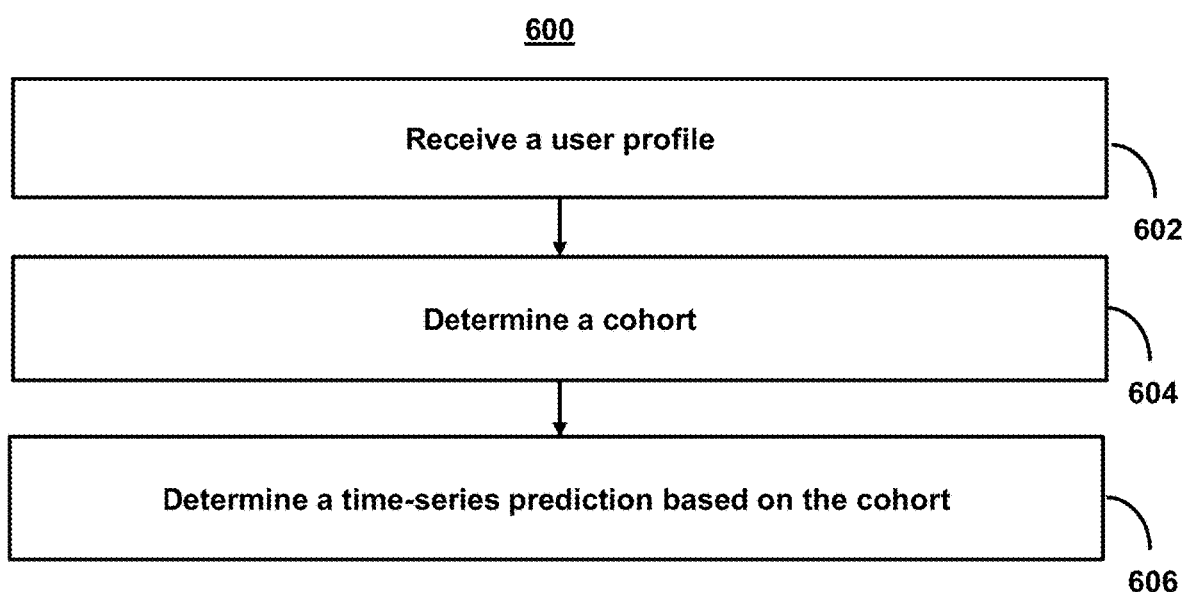

FIG. 6 shows a flowchart of the steps involved in generating time-series predictions using artificial intelligence models based on cohort clusters, in accordance with one or more embodiments.

Figure 7:
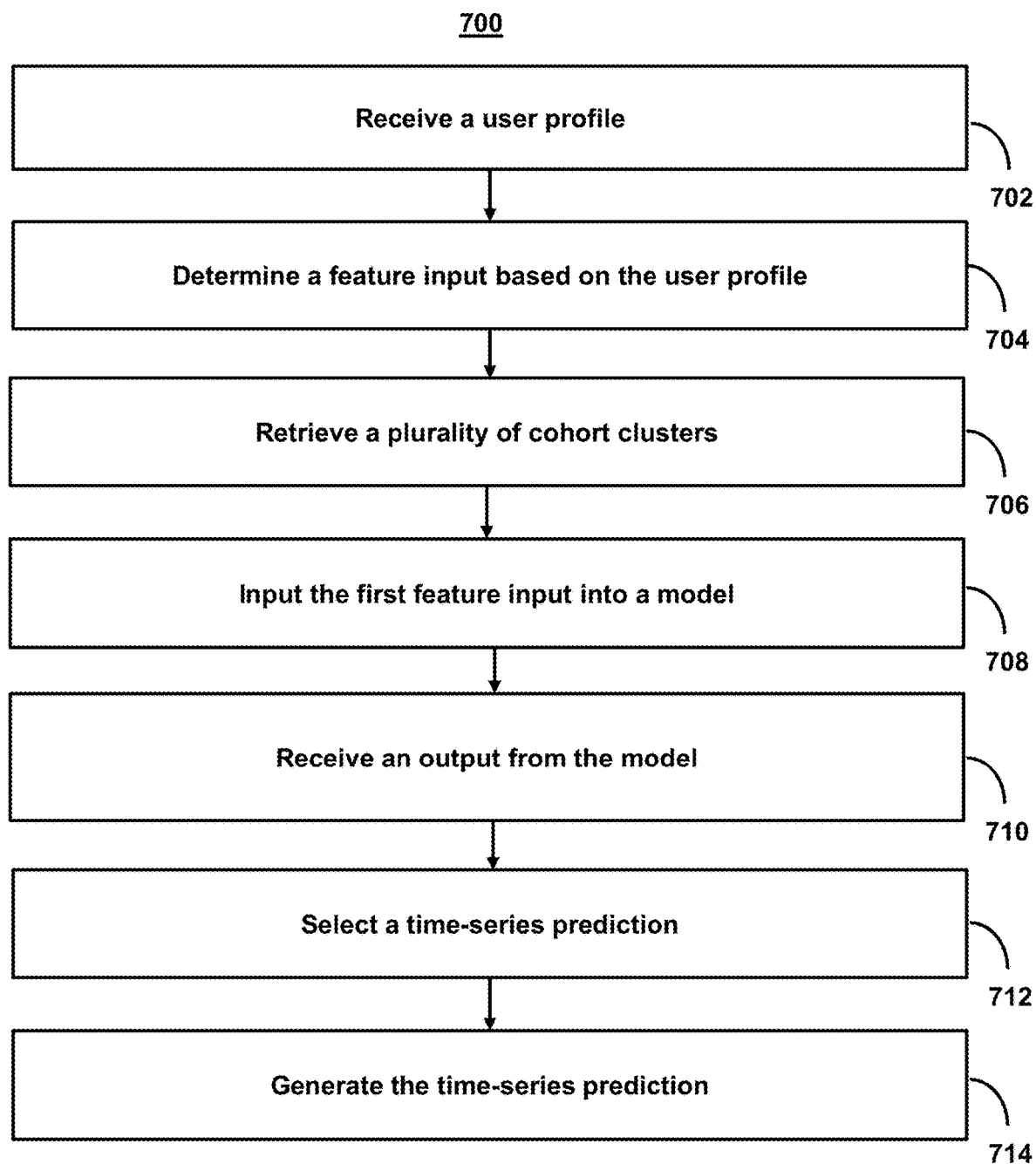

FIG. 7 shows a flowchart of the steps involved in using cohort-based predictions in clustered time-series data in order to detect significant rate-of-change events, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, systems and methods may use one or more artificial intelligence models that predict an effect and/or occurrence of a predicted event based on the current state of the system. For example, the model may predict how a rate of change in time-series data (e.g., representing a current growth trajectory of the state) may be altered throughout the first time period based on the predicted event. However, as noted above, correctly predicting the occurrence of these events (which may comprise outliers to the normal trajectory), and in particular characteristics about these events (e.g., when an event may occur, what may be a source of the event, what rate of change the event may cause, etc.) in data-sparse environments (including environments featuring data with low interpretability), and based on time-series data, presents a technical challenge.

For example, in such data-sparse environments, one solution is to generate artificial data. While there are various techniques for doing so, generating artificial time-series data is particularly problematic as the temporal relationship between the data must be preserved. Because of this, the techniques for generating artificial time-series data are limited to the techniques that can preserve and/or mimic this relationship. One such approach may include distribution-based techniques for generating artificial data (e.g., using bootlegging, resampling, etc.). Distribution-based techniques aim to mimic (not duplicate) time-series data at its normal distributions. However, while distribution-based techniques may mimic the "average" data, distribution-based techniques are ill suited for generating outliers (e.g., events with significant impact) within the data. This is particularly problematic in applications in which the outliers are more important.

To overcome this technical challenge, the system may generate predictions based on non-homogenous data. The system may use a first data set to determine a trajectory of a current state. The system may then use a different data set to predict the occurrence of the outlier event. For example, the system may select a second data set (i.e., a non-homogenous data set) comprising actual (i.e., not predicted) data thus creating a "synthetic profile." The actual data found in the synthetic profile may comprise historic time-series data in which the historic time-series data indicates historic rates-of-change over a given time period. Furthermore, the system may filter the historic data set that is used based on similarities between the current state characteristics and/or required future state characteristics of the first system at the end of the first time period. That is, the system may select a second data set from a plurality of historic data sets based on the second data set having certain characteristics (e.g., similar state characteristics at the beginning or ending of a selected time period, similar trajectories, similar user profiles of users upon which the state is based, etc.). The system may then analyze the second data set for potentially significant events (e.g., events corresponding to a rate of change beyond a threshold).

Notably, upon identifying potentially significant events, which may include its time and magnitude, the system combines this information along with the first data set to generate a first feature input. Furthermore, to alleviate issues, if any, resulting from the differences in the non-homogenous data, the information (e.g., time, magnitude, and/or other characteristics) about predicted events is normalized to correspond to the characteristics of the first data set. For example, if a predicted event occurs in the fifth year from the beginning of the second time period, the system normalizes the predicted event to occur in the fifth year from the beginning of the first time period (even if the first time period and the second time period began at different times). The first feature input is then submitted to an artificial intelligence model that is trained to predict first rates-ofchange over a first time period. The previously identified predictions (e.g., corresponding to a predicted event and/or characteristics of the event) are then applied to first rates-of-change over the first time period to generate recommendations for responding to the predicted events (e.g., recommending to maintain a current state, recommending to modify a state in a particular manner, etc.).

For example, by training the artificial intelligence model on both the first and second data set, the system mitigates the problem with low amounts of high-quality data (e.g., the system maximizes the amount of training data available). Secondly, by using the actual data from the second data set (e.g., indicating past events), the system mitigates potential precision and accuracy issues in relying on an artificial intelligence model to predict outlier events to a trajectory of the time-series data and/or characteristics about the outlier events. Furthermore, the system may in some embodiments process numerous data sets to identify predicted events and average information about them. Finally, by combining the normalized predicted events data with the first data set, the system generates predictions based on the state of the first data set, but with predicted events occurring at the normalized time and having the normalized magnitude.

In some embodiments, systems and methods for responding to predicted events in computer systems based on predicted events in time-series data using artificial intelligence models trained on non-homogenous, time-series data are described. For example, the system may receive a first data set comprising a current state characteristic for a first system state. The system may receive a required future state characteristic for the first system state. The system may select a second data set from a plurality of available datasets based on similarities between state characteristics for the second data set and the current state characteristic and the required future state characteristic, wherein the second data set comprises second rate-of-change data over a second time period. The system may compare the second rate-of-change data to a threshold rate of change to detect a rate-of-change event. The system may generate a normalized rate-of-change event by normalizing the rate-of-change event based on the first data set. The system may input the first data set into a first model to generate first rate-of-change data over a first time period for the first system state. The system may generate modified first rate-of-change data based on the normalized rate-of-change event. The system may generate for display, on a user interface, a recommendation based on the modified first rate-of-change data.

Figure 1A:
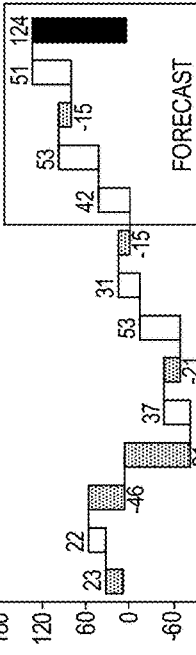
FIG. 1A shows an illustrative user interface comprising recommendations based on a synthetic profile, in accordance with one or more embodiments.

FIG. 1A shows an illustrative user interface comprising recommendations based on a synthetic profile, in accordance with one or more embodiments. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

In some embodiments, the content may comprise a client portal that provides recommendations based on one or more models. For example, the client portal may identify context-relevant, time-based observations and share these observations as recommendations (e.g., recommendation 102) with the client. The recommendations may provide a line of sight to the areas that clients may want to consider but were not aware they should be considering in an intermediate timeframe. For example, the clients have numerous options for planning major life events and the system (e.g., via user interface 100) may act as a conduit to allow clients to have control of the intermediate term and expose them to one or more features.

In some embodiments, the content may comprise awards that are achievable within certain timeframes to incent behavior in line with the client's unique objectives (e.g., recommendation 104). For example, by establishing a "status" level with various aspirational levels, the system may incentivize a client to increase use of the system. The system may also provide one or more recommendations that are interactive. These interactive recommendations may allow a user to enter data or save data (e.g., via icon 106).

In some embodiments, the system may monitor content generated by the user to generate user profile data such as user profile data 108. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system's active or passive monitoring.

In some embodiments, a user characteristic may comprise a current state characteristic. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc. For example, user profile data 108 may comprise a current state characteristic.

In some embodiments, a user characteristic may comprise a required future state characteristic. For example, the "required future state characteristic" may comprise a given rate of return, a total value of the account, etc. for the user account. As shown in FIG. 1A, a required future state characteristic may comprise a required savings percentage (e.g., user profile data 110). For example, the system may receive a required future state characteristic for the first system state.

Figure 1B:
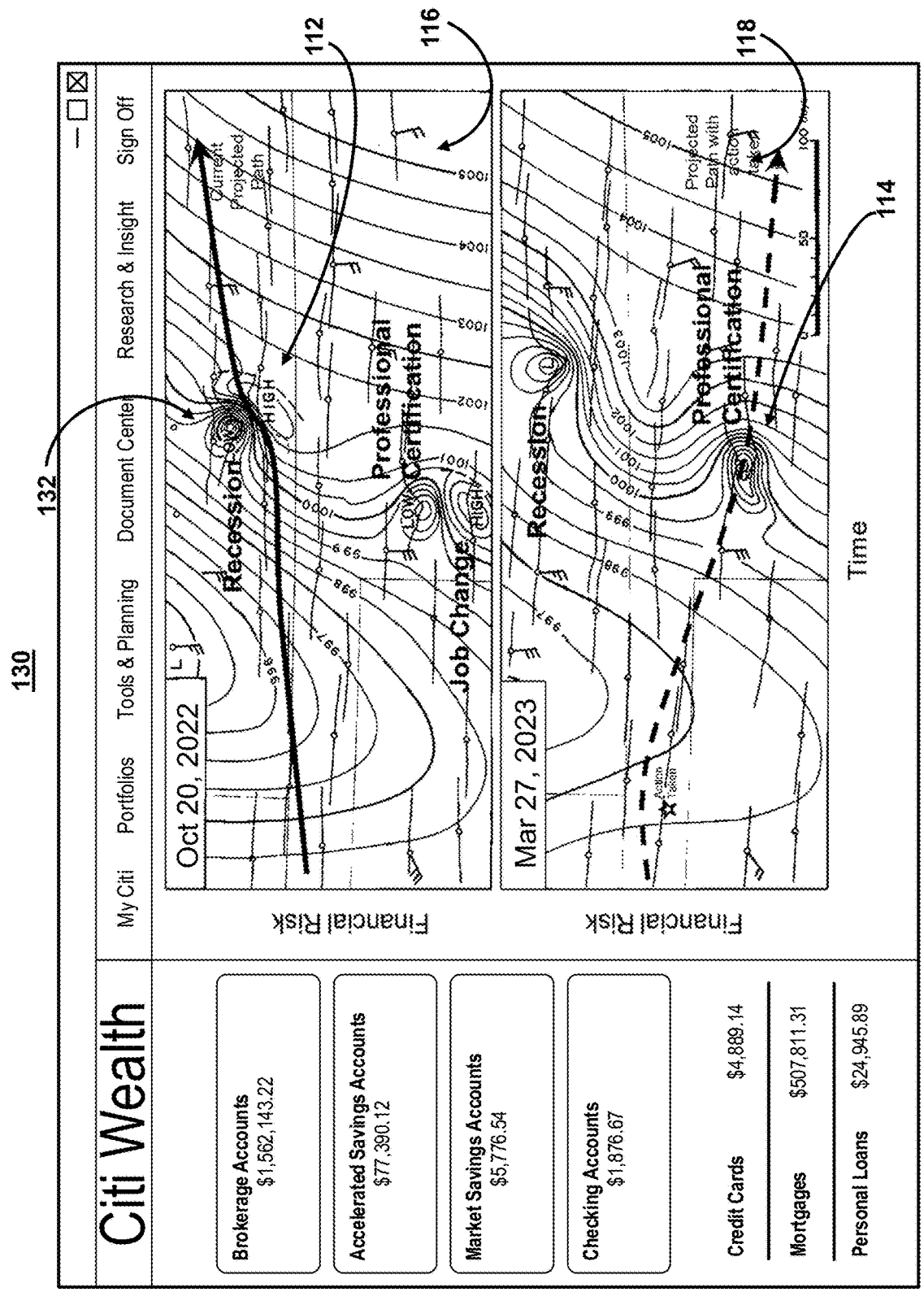
FIG. 1B shows another illustrative user interface comprising an isobaric graphical representation based on a synthetic profile, in accordance with one or more embodiments.

FIG. 1B shows another illustrative user interface comprising an isobaric graphical representation based on a synthetic profile, in accordance with one or more embodiments. For example, in some embodiments, the system may display content in the form of a graphical representation (e.g., either static or dynamic) as shown in user interface 130. One such graphical representation may comprise an isobaric graph. In such cases, an outlier event may be represented by an identified pressure point. For example, the system may discern that a particular event or sequence of events results in either statistically significant positive or negative consequences. For example, an isobaric graph is a graph commonly used in mesoanalysis. Mesoanalysis often involves the representation of values according to a gradient or vector and often with a variable scaling factor. For example, mesoanalysis may be used to measure temperature, moisture, pressure, and/or wind variations on horizontal scales of 10-100 km.

For example, an outlier may be analogous to a pressure area on an isobaric chart. It is an area over time where there is a high likelihood that an extreme (high or low) value for the Y-axis unit of measure would be experienced. In one example, such as where the time-series data represents a financial projection, the outlier event may represent a windfall event or a personal or financial emergency that negatively affects the financial projection. Based on detecting these events, the system may generate a recommendation to maintain a current trajectory of a predicted state or may recommend a change to the state.

Alternatively or additionally, the system may determine rate-of-change data over a time period. To do so, the system may analyze time-series data. As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time series analysis. For example, a time-series analysis may be useful to see how a given asset, security, or economic variable changes over time. It can also be used to examine how the changes associated with the chosen data point compare to shifts in other variables over the same time period. For example, with regard to stock portfolio performance, the system may receive time-series data for the various sub-segments indicating daily values for individual stock returns.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set by applying a compression algorithm. For example, the system may receive a raw time-series data. The system may generate a data set by applying a compression algorithm to the raw time-series data.

The time-series analysis may determine various trends such as a secular trend, which describes the movement along the term, a seasonal variation, which represents seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data which may render correlations, if any, undetectable and/or lead to the detection of false-positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depend heavily on the normalization choices. Thus, normalization may lead to lower model performance and more model errors.

As such, the system may not rely on a model and data from a first data set (e.g., from a first user) to predict the occurrence of the outlier event. That is, the system does not rely on a model to detect outlier events. Instead, the system may select a second data set (i.e., a non-homogenous data) comprising actual (i.e., not predicted) data, creating a "synthetic profile." The actual data found in the synthetic profile may comprise second time-series data in which the second time-series data indicates second rates-of-change over a second time period. The system may select the second data set (or a plurality of data sets) based on similarities between the current state characteristics and/or required future state characteristics of the first system at the end of the first time period. The system may then analyze the second data set for predicted events (e.g., events corresponding to a rate of change beyond a threshold).

For example, the system may comprise a cohort prediction modeling system. The cohort prediction modeling system may identify similar sets of data to that of a user. By doing so, the system may evaluate similar multi-variate time-series data to correlate relationships between events or trends and likely outcomes. The data sets may comprise multiple sets of data and/or data collection means. For example, the system may use an array of real-time events, batch data, and/or collected and conditioned data from a wide variety of structured and unstructured data sources to define the cohorts and capture client specific targeted local, regional, and national data.

In some embodiments, the system conditions individual data sets identifying time-based rates-of-change. Using ensemble methods, the system combines conditioned data to detect outliers (non-obvious contextual time-based pressure events) creating a "synthetic model". The "synthetic model" outliers are weighted to compare current state characteristics to future state contextually relevant time-based characteristics allowing for course disruptions (edge path selection) to be identified.

As referred to herein, a "cohort" may comprise one or more other users. Data related to the cohort may be used to generate a synthetic profile. The system may select the cohort based on similarities between user profile data of a first user and the user profile data of the one or more other users. For example, the system may compare current state characteristics and/or required future state characteristics (e.g., at the end of the first time period) of the first system (e.g., of a first user) to the state characteristics over a time period corresponding to the first time period.

For example, the system may determine a current state characteristic of a first user (e.g., a first account balance) and a required future state characteristic (e.g., an account balance of the first account after five years). The system may then find other users that have historical data showing an initial account balance corresponding to the first account balance and then a final account balance after five years that corresponds to the required future state characteristic. Upon determining that the one or more other users are part of the first user's cohort, the system may retrieve user profile data for the one or more other users. The user profile data of the one or more users may become a second data set upon which a synthetic profile is generated. In some embodiments, the system may collect and condition data to allow a model to "train" itself (e.g., as further described in FIGS. 3A-B below), finding correlations and defining cohorts.

In some embodiments, a cohort may comprise a set that consists of the entities that experienced the data being captured and analyzed. Cohorts may share common attributes that cause them to be selected as members of the set. The system may analyze the cohort data to discern patterns that lead to predicted outcomes. The cohort data may comprise numerous data streams with many units of measures. The system may then segregate the data streams by cohort.

Upon identifying predicted events (e.g., including both their time and magnitude) such as pressure point 112 and pressure point 114 in graph 116 and graph 118, the system combines this information along with the first data set to generate a first feature input. Furthermore, the information about predicted events is normalized to begin at a time corresponding to the first data set. That is, if the predicted event occurs in the fifth year of the second time period, the system normalizes the predicted event to occur in the fifth year of the first time period (even though the predicted event is actually years in the past). The first feature input is then submitted to an artificial intelligence model that is trained to predict first rates-of-change over a first time period. The previously identified predictions (e.g., corresponding to a predicted event and/or characteristics of the predicted events) are then applied to first rates-of-change over the first time period to generate recommendations for responding to predicted events.

For example, a predicted event, outlier event, and/or pressure point (e.g., pressure point 112 and pressure point 114) may comprise events or situations that present a current or future risk. For example, a predicted event, outlier event, and/or pressure point may be the breaching of a value on the Y-axis unit of measure, where a boundary threshold has been calculated as the upper or lower limit at a given point in time. The system may detect pressure points of interest as ones presented to the client that have a reasonable likelihood of occurring based on the experiences of others in the cohort. The system may also determine degrees of probability of the likelihood of a user navigating (e.g., based on user profile data) into a pressure point, based on the client's trajectory, which is influenced by the client's user profile data, positions, cohort, and/or internal and external state characteristics.

Each pressure points have varying degrees of impact, either positive or negative. As such, the system may determine both the likelihood of a pressure point as well as its time and/or magnitude. The system may express this impact by the pressure point's position on the Y axis of the isobar map (e.g., graph 116).

As referred to herein, "a data set" may refer to data that is received from a data source that is indexed or archived by time. This may include streaming data (e.g., as found in streaming media files) or may refer to data that is received from one or more sources over time (e.g., either continuously or in a sporadic nature). A data set may indicate a state of the data set at a given time period. For example, a state or instance may refer to a current set of data corresponding to a given time increment or index value. For example, the system may receive time-series data as a data set. A given increment (or instance) of the time-series data may correspond to a state of the data set.

In some embodiments, the system may time-shift data in order to normalize the data. For example, in order to compare a second data set to a first data set, the system may time shift the data so that the historic data is applied in an appropriate and consistent manner. As one example, if a current state characteristic and a required future state characteristic are five years apart, the system may select data based on identifying a corresponding initial state characteristic and then determining whether data corresponding to five years later corresponds to the required future state characteristic.

In some embodiments, the system may apply additional normalization to account for the effect of time-shifting. For example, in some embodiments, the analysis of time-series data presents comparison challenges that are exacerbated by normalization. For example, a comparison of data from the same period in each year does not completely remove all seasonal effects. Certain holidays such as Easter and Chinese New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2000 and 2001). This comparison ignores the moving holiday effect of Easter. Easter occurs in April for most years but if Easter falls in March, the level of activity can vary greatly for that month for some series. This distorts the original estimates. A comparison of these two months will not reflect the underlying pattern of the data. The comparison also ignores trading day effects. If the two consecutive months of March have different composition of trading days, it might reflect different levels of activity in original terms even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may in some cases be normalized to account for this issue, the normalization of one data stream set may affect another data stream set.

In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

For example, the system may generate an isobaric representation of the time-series prediction (e.g., graph 116 (FIG. 1B)). The system may identify a predicted event (e.g., pressure point 112 (FIG. 1B)) for the time-series prediction in the isobaric representation. Additionally or alternatively, the system may generate an option (e.g., recommendation 152 (FIG. 1D)) to modify the current state characteristic based on the predicted event.

In some embodiments, the system may determine a gradient for the time-series prediction. For example, the gradient of a scalar-valued differentiable function (f) of several variables is the vector field (or vector-valued function)

whose value at a point (p) is the direction and rate of fastest increase. For example, the system may determine a gradient for the time-series prediction. The system may determine a magnitude of the gradient. The system may identify a predicted event for the time-series prediction based on the magnitude. For example, the time-series prediction may be represented in an isobaric graph. The system may then process the isobaric graph to determine one or more predicted events. These predicted events may comprise a local maxima or local minima of the isobaric graph (e.g., maxima 132). For example, if the gradient of a function is non-zero at a point (p), the direction of the gradient is the direction in which the function increases most quickly from (p), and the magnitude of the gradient is the rate of increase in that direction, the greatest absolute directional derivative. The system may determine a point in the isobaric graph in which point (p) equals zero (e.g., representing a local minimum or local maximum). For example, a point on a graph (or its associated function) whose value is less than all other points near it is a local minimum, whereas a point on a graph (or its associated function) whose value is greater than all other points near it is a local maximum. The system may detect local minimums and maximums to identify a predicted event.

Additionally or alternatively, the system may determine the severity of a predicted event based on the magnitude of the gradient. For example, the magnitude of the gradient is the rate of increase in that direction. This rate may be positive or negative. Furthermore, the larger the magnitude (e.g., the absolute value of the magnitude), the greater the effect on the system state and/or a characteristic thereof. For example, based on the magnitude (and whether it is positive or negative), the system may represent a windfall event or a personal or financial emergency that negatively affects the financial projection. For example, the system may determine an effect of the predicted event based on the magnitude. The system may generate a user recommendation based on the effect.

In some embodiments, the system may perform isotropic scaling on the time-series prediction to identify a predicted event. For example, isotropic scaling is a linear transformation that enlarges (increases) or shrinks (diminishes) objects by a scale factor that is the same in all directions. In some embodiments, the system may perform non-uniform scaling (anisotropic scaling) obtained when at least one of the scaling factors is different from the others. For example, the system may determine a scale factor for the time-series prediction. The system may perform, based on the scale factor, a linear transformation to the time-series prediction to identify a predicted event for the time-series prediction.

Figure 1C:
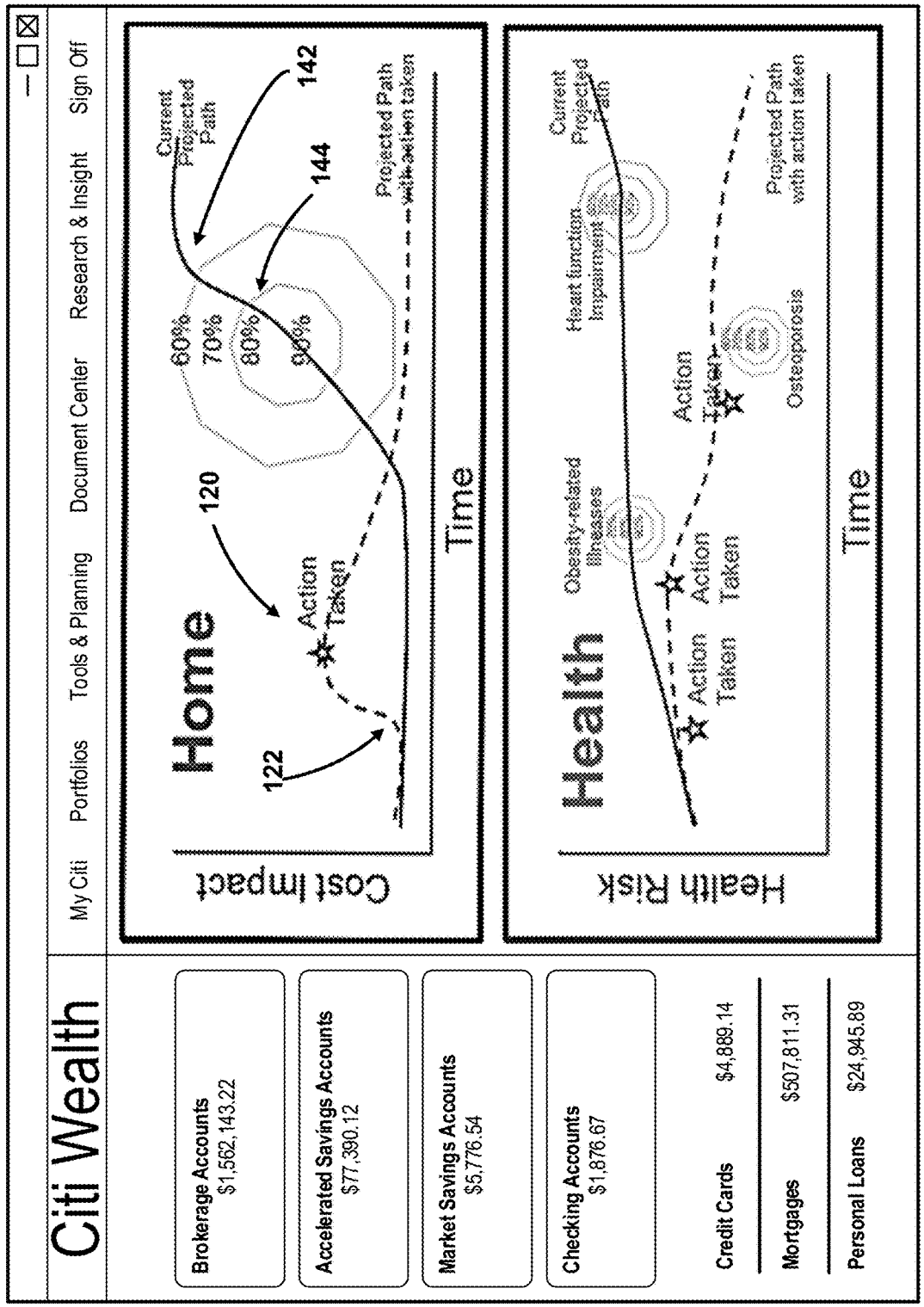
FIG. 1C shows an illustrative user interface comprising a recommendation based on an isobaric graphical representation, in accordance with one or more embodiments.

FIG. 1C shows an illustrative user interface comprising a recommendation based on an isobaric graphical representation, in accordance with one or more embodiments. For example, the system may generate time-series predictions on the first user profile data and/or any other current state data to generate multiple dimension representations of state characteristics (e.g., risk, health, financials, etc.) to determine if a time-series prediction intersects with an outlier event (e.g., a pressure point) or diverges from a desired path. The system may then provide recommendations to adjust course and track subsequent actions.

For example, as shown in FIG. 1C, the system has determined time-series prediction 142 that includes predicted event 144. For example, the system may select a second data set from a plurality of available datasets based on similarities between state characteristics for the second data set, the current state characteristic, and the required future state characteristic, wherein the second data set comprises second rate-of-change data over a second time period. That is, the system may select a second data set based on a cohort of a user.

In some embodiments, the system may use an artificial intelligence model to select a cohort of the user. For example, the system may use a model to select a cohort of the user and then select a data set corresponding to the selected cohort. For example, the system may receive historical time-series data. The system may train a second model using unsupervised learning, wherein the second model comprises a convolutional neural network. The system may select the second data set from the plurality of available datasets using the second model.

The system may compare the second rate-of-change data to a threshold rate of change to detect a rate-of-change event. This rate-of-change event may comprise an outlier event (e.g., predicted event 144) as this rate-of-change event comprises a point at which a rate of change equaled or exceeded a threshold rate of change. In response to determining time-series prediction 142 and predicted event 144, the system may provide recommendation 120 and generate time-series prediction 142. Time-series prediction 142 may represent a result of accepting recommendation 120.

For example, the system may project, based on cohort experience and event likelihood correlation, that an intersection will occur with a pressure point and the current trajectory. In some embodiments, the system may provide multiple selectable actions to the user that the user can use to alter time-series predictions. For example, the system may deliver a time-series prediction visualization of the likely outcome of the selected actions. The system may then track the actions to further enhance the model's learning. As such, the system may generate a display of the calculated projection and provide the ability to render the end-to-end path and produce a visualization of the user's path over time as it nears a pressure point. The system may also compare the initial projection to the actual course to improve learning.

In some embodiments, the system may use an artificial intelligence model to determine an effect of a rate-of-change event on a state of a system (e.g., a time-series prediction). For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

Additionally or alternatively, the system may generate modified first rate-of-change data based on the normalized rate-of-change event. For example, the modified first rate-of-change data may predict the change in a user's account over a time period after applying disruptive events. For example, the system may detect whether pressure points can be avoided by taking actions, adjusting behaviors, etc. The system may recognize the underlying causes of pressure points by analyzing the experiences of the cohort. Upon determining the cause, the system may recommend actions to influence the client's path. In some embodiments, the actions may require action and may have costs. The cost or "sacrifice" may be expressed by the system on the recommended path's movement on the Y axis of the isobar map.

Figure 1D:
FIG. 1D shows an illustrative user interface comprising recommendations based on a synthetic profile, in accordance with one or more embodiments.

FIG. 1D shows an illustrative user interface comprising recommendations based on a synthetic profile, in accordance with one or more embodiments. For example, FIG. 1D shows an illustrative recommendation that may appear on a mobile user device. In some embodiments, the system may generate recommendations in a dynamic manner. For example, the system may generate one or more recommendations in response to one or more detected triggering events.

In some embodiments, a triggering event may comprise user profile data updates that may affect a state of a system. For example, the system may detect that a user is about to make a large purchase that may cause a time-series prediction based on the resulting state of the system (e.g., a user account of the user) to be positively or negatively affected (or cause a rate-of-change event to equal or exceed a threshold rate-of-change). In response, the system may generate a recommendation (e.g., recommendation 152) on user interface 150.

Figure 2:
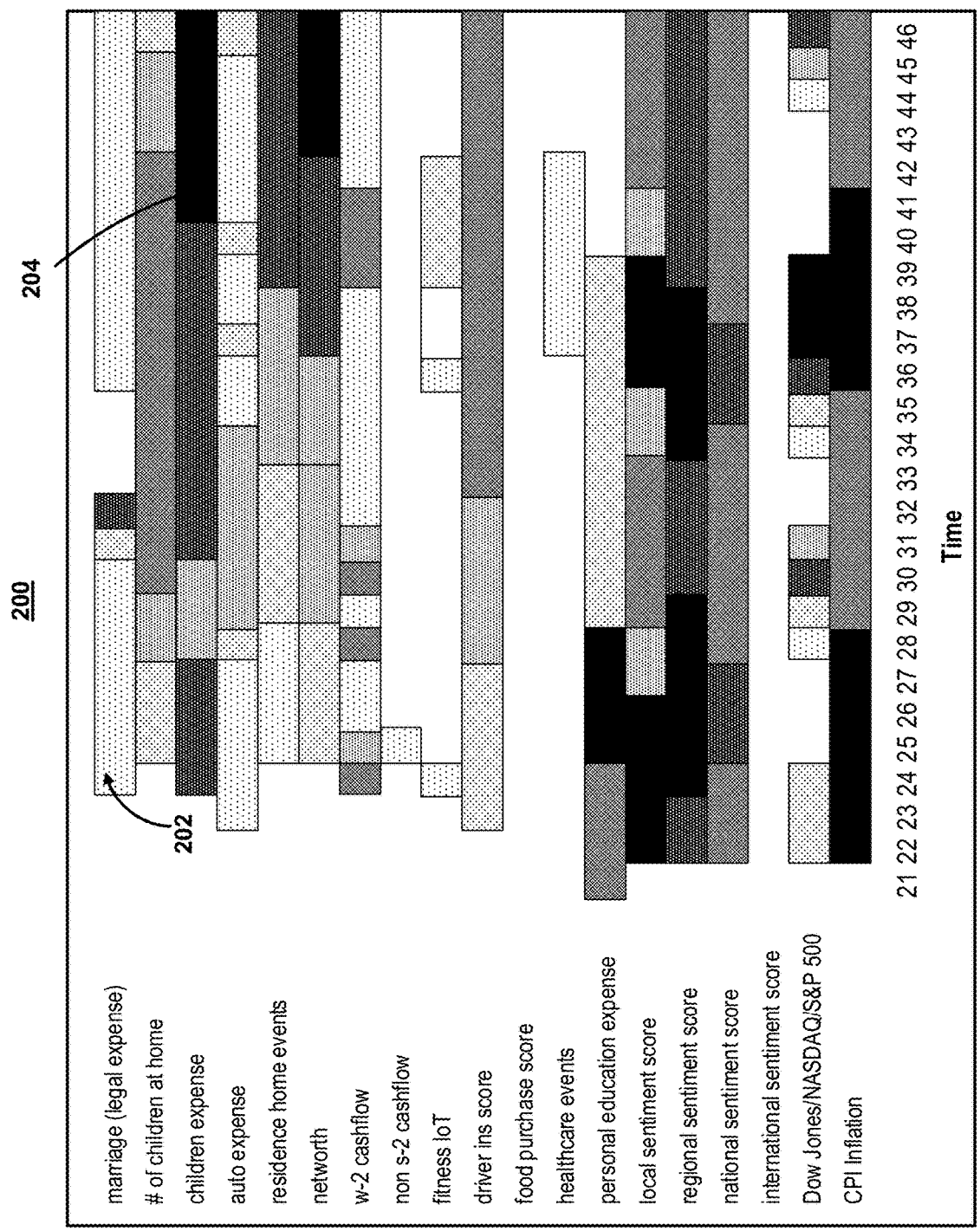
FIG. 2 shows an illustrative diagram comprising predicted rates-of-change over a time period, in accordance with one or more embodiments.

FIG. 2 shows an illustrative diagram comprising predicted rates-of-change over a time period, in accordance with one or more embodiments. For example, FIG. 2 includes diagram 200, which may indicate a likelihood of a given predicted event or outlier event based on a given characteristic. Diagram 200 indicates a likely time period and/or magnitude of a given predicted event or outlier event. For example, diagram 200 represents data that may be used to generate one or more pressure points (e.g., pressure point 112 (FIG. 1B) and pressure point 114 (FIG. 1B)). In some embodiments, diagram 200 may represent a data set corresponding to a given cohort. For example, the synthetic profile may be used to display events across time in the second data set.

In some embodiments, diagram 200 may indicate one or more edge conditions. Edge Conditions may comprise data points where the system has determined that a strong correlation exists between two or more other data points. As shown on the Y axis of diagram 200, various data points (e.g., categories of events) have been determined by the system to correlate to a rate-of-change event both in terms of a likely time and magnitude. For example, point 202 indicates a low magnitude/likelihood of an outlier event (e.g., a pressure point) at time "22" (e.g., corresponding to a user age of twenty-two) and an outlier event with a large magnitude (e.g. indicating a low likelihood of a user marrying at that time and/or such an outlier event having a large effect on a rate-of-change of the state of the system). In contrast, point 204 indicates a high magnitude/likelihood of an outlier event (e.g., a pressure point) at time "42" (e.g., corresponding to a user age of forty-two) and an outlier event with a large magnitude (e.g., indicating a high likelihood of a user having a child expense at that time and/or such an outlier event having a large effect on a rate-of-change of the state of the system).

As shown in diagram 200, there are both "negative" and "positive" edge conditions that may have positive or negative effects on a rate-of-change of the state of the system. In some embodiments, the system may determine an edge condition and/or its effect. Based on its effect (e.g., magnitude), the system may select a threshold rate. Additionally or alternatively, the system may determine whether or not a user may be affected by an edge condition based on user profile data. For example, the system may determine whether or not a user is likely to approach an age and/or may otherwise likely be affected by an edge condition. For example, the system may determine based on data about the user that the user is likely to experience an event of a given type. For example, the system may retrieve user profile data. The system may determine the event type based on the user profile data. To detect the edge conditions, the system may compare the second rate-of-change data to a threshold rate of change. For example, the system may detect predicted events in the system state based on large changes in the rate-of-change of the user account. These large charges may correspond to external events such as a marriage, death, divorce, market downturn, etc.

FIGS. 3A-B show illustrative models for a system used to generate recommendations based on a synthetic profile, in accordance with one or more embodiments. For example, FIG. 3A includes system 300. System 300 includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., select a second data set from a plurality of available datasets based on similarities between state characteristics for the second data set and the current state characteristic and the required future state characteristic).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to select a second data set from a plurality of available datasets based on similarities between state characteristics for the second data set and the current state characteristic, and the required future state characteristic.

Model 302a is shown as a convolutional neural network. A convolutional neural network consists of an input layer (e.g., input 304a), hidden layers, and an output layer (e.g., output 306a). As shown in FIG. 3A, the middle layers are called hidden because their inputs and outputs are masked by the activation function and final convolution (e.g., convolutions of 32, 64, and 128). For example, each convolution may comprise an array of weights, which represent part of the input. While each may vary in size, the filter size may comprise a matrix that determines the size of the receptive field. The filter is then applied to an area of the input, and a dot product is calculated between the input pixels and the filter. This dot product is then fed into an output array.

In a convolutional neural network, the hidden layers include layers that perform convolutions. Model 302a may comprise convolutional layers that convolve the input and pass its result to the next layer. Model 302a may also include local and/or global pooling layers along with traditional convolutional layers. Pooling layers reduce the dimensions of data by combining the outputs of neuron clusters at one layer into a single neuron in the next layer. Also as shown, model 302a may comprise fully connected layers that connect every neuron in one layer to every neuron in another layer.

FIG. 3B includes system 310. As shown in FIG. 3B, in some embodiments, system 310 may comprise one or more components of system 300 (FIG. 3A). For example, system 310 may comprise model 302b, which may have been trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., select a second data set from a plurality of available datasets based on similarities between state characteristics for the second data set and the current state characteristic, and the required future state characteristic).

FIG. 3B also illustrates components for generating recommendations based on a synthetic profile. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a handheld computer, and other computer equipment (e.g., a server), including "smart," wireless, wearable, and/or mobile devices. System 300 may also include cloud components. For example, cloud components may be implemented as a cloud computing system and may feature one or more component devices. It should be noted, that while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

FIG. 4 shows a diagram for creating synthetic profiles, in accordance with one or more embodiments. For example, diagram 400 may represent a system workflow for responding to events based on predictions in time-series data. For example, the systems and methods may detect significant events (e.g., identify and measure discrete and non-discrete rates-of-change in time-series beyond a contextually relevant common threshold) that represent predicted significant events (e.g., predicted instances in first time-series data in which first rates-of-change over a first time period are beyond the contextually relevant threshold). Based on these predictions, the system may provide recommendations for changes in existing system states that may mitigate the effects and/or occurrence of these predicted events (e.g., provide recommended changes to current system state characteristics in order to mitigate predicted rates-of-change over a first time period in the first time-series data). Furthermore, these recommendations may be based on non-obvious positive and negative events that are time-based and contextually relevant to a given individual/entity.

For example, diagram 400 may represent three stages of predicting events using synthetic profiles. For example, stage 402 may represent processing a first data set. For example, the system may receive a first data set comprising a current state characteristic for a first system state. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc.

For example, the system may predict how a rate of change in time-series data (e.g., representing a current growth trajectory of the state) may be altered throughout the first time period. That is, the system may determine a current trajectory of the state based on current characteristics. For example, in the automated home office example, the system may determine a current trajectory of a portfolio of a user based on current characteristics (e.g., size of the portfolio, distributions within the portfolio, diversity in assets of the portfolio, etc.). However, as noted above, correctly predicting an occurrence of a significant event (which may comprise outliers to the normal trajectory), and in particular characteristics about these significant events (e.g., when an event may occur, what may be a source of the event, what rate of change the event may cause, etc.) presents a technical challenge. To overcome this technical challenge, the system may generate predictions based on non-homogenous data. For example, while the system may use a first data set to determine a trajectory of a current state, the system may then use a different data set to predict the occurrence and/or effect of the outlier events. For example, the system may determine when an event occurs, the effects of which may move a predicted trajectory outside the edge boundaries of the current trajectory. With respect to the automated home office example, this event may represent a windfall event that positively effects the portfolio (and/or its trajectory) or an emergency that negatively effects the portfolio (and/or its trajectory).

Stage 404 may represent detecting a cohort for the user for generating a synthetic profile upon which events may be predicted. The synthetic profile may be used to display events across time in the second data set (e.g., as shown in FIG. 2). For example, the system may select a second data set from a plurality of available datasets based on similarities between state characteristics for the second data set and the current state characteristic, and the required future state characteristic, wherein the second data set comprises second rate-of-change data over a second time period. The second data set may comprise account data for another user. The similarities in the state characteristics may include current and future positions, values, expectations, etc. The system may use the similarities to determine a cohort for the first user. In some embodiments, the system may process numerous datasets to identify predicted events and average information about them.

In some embodiments, the system selects a second data set (i.e., non-homogenous data) that comprises actual (i.e., not predicted) data, creating a synthetic profile. For example, the system may use a first data set to determine a trajectory of a current state at stage 402. The system may then use a different data set to predict the occurrence of an outlier event and/or its effect in stage 404. For example, the system may select a second data set (i.e., non-homogenous data) comprising actual (i.e., not predicted) data thus creating a "synthetic profile." The actual data found in the synthetic profile may comprise historic time-series data in which the historic time-series data indicates historic rates-of-change over a given time period. Furthermore, the system may filter the historic data set that is used based on similarities between the current state characteristics and/or required future state characteristics of the first system at the end of the first time period. That is, the system may select a second data set from a plurality of historic datasets based on the second data set having certain characteristics (e.g., similar state characteristics at the beginning or ending of a selected time period, similar trajectories, similar user profiles of users upon which the state is based, etc.). The system may then analyze the second data set for potentially significant events (e.g., events corresponding to a rate of change beyond a threshold).

As shown in stage 404, the system may normalize data by time-shifting cohort data. For example, the cohort data may comprise data that is multiple years beyond the data in the first data set. The system may then normalize this data by time-shifting any predicted event. For example, the system may generate a normalized rate-of-change event by normalizing the rate-of-change event based on the first data set. For example, the system may normalize the rate-of-change event by time-shifting the date of occurrence, adjusting a magnitude based on inflation, etc.

As such, the system alleviates issues, if any, resulting from the differences in the non-homogenous data, and the information (e.g., time, magnitude, and/or other characteristics) about predicted events is normalized to correspond to the characteristics of the first data set. In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

For example, as shown in FIG. 4, data in the second data set predicts events that may occur during the ages of 35-38 of a user that is currently 34. For example, the second data set may comprise data from one or more other users that reflects events that occurred (and/or the effects thereof) during the ages of 35-38 for those users. The system normalizes the predicted event to occur in corresponding years for the user from the beginning of the first time period (even if the first time period and the second time period began at different times). For example, if an event is predicted in the second data set to occur at age 36, the system may normalize this to the first user as likely to occur in two years.

The first feature input is then submitted to an artificial intelligence model that is trained to predict first rates-of-change over a first time period. The previously identified predictions (e.g., corresponding to a predicted event and/or characteristics of the event) are then applied to first rates-of-change over the first time period to generate recommendations for responding to the predicted events (e.g., recommending to maintain a current state, recommending to modify a state in a particular manner, etc.).

Stage 406 may represent determined effects of events (predicted by the synthetic profile) on the first data and/or providing a recommendation for responding to the effects of the predicted event (e.g., by maintaining a current trajectory of the state or changing a trajectory of the state). For example, the system may input the first data set into a first model to generate first rate-of-change data over a first time period for the first system state. For example, the first model may predict the change in a user's account over a time period without any significant events.

In some embodiments, the system may use an artificial intelligence model to determine an effect of a rate-of-change event on a state of a system. For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

For example, the system may generate modified first rate-of-change data based on the normalized rate-of-change event. For example, the modified first rate-of-change data may predict the change in a user's account over a time period after applying disruptive events. For example, the system may generate for display, on a user interface, a recommendation based on the modified first rate-of-change data. For example, a recommendation may include new holdings, positions, investments, etc. to mitigate the disruptive events. In some embodiments, the recommendation may comprise an isobaric graphical representation. Alternatively or additionally, the recommendation comprises an option to adjust the current state characteristic. For example, the system may recommend that a user adjust one or more current state characteristics to mitigate a detected event.

By training the artificial intelligence model or models on both the first and second data set, the system mitigates the problem with low amounts of high-quality data (e.g., the system maximizes the amount of training data available). Secondly, by using the actual data from the second data set (e.g., indicating past events), the system mitigates potential precision and accuracy issues in relying on an artificial intelligence model to predict outlier events to a trajectory of the time-series data and/or characteristics about the outlier events. By combining the normalized predicted events data with the first data set, the system generates predictions based on the state of the first data set, but with predicted events occurring at the normalized time and having the normalized magnitude.

FIG. 5 shows a flowchart of the steps involved in responding to predicted events in computer systems based on predicted events in time-series data, in accordance with one or more embodiments. For example, the system may use process 500 (e.g., as implemented on one or more system components described above) in order to mitigate events in computer systems based on predicted events in time-series data using artificial intelligence models trained on non-homogenous time-series data.

At step 502, process 500 (e.g., using one or more components described above) receives a first data set. For example, the system may receive a first data set comprising a current state characteristic for a first system state. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set by applying a compression algorithm. For example, the system may receive a raw time-series data. The system may generate a data set by applying a compression algorithm to the raw time-series data.

In some embodiments, the system may compress data using midimax compression. Midimax compression involves determining the minimum, median, and maximum points of segments of the raw time-series data. Notably, midimax compression only returns a subset of the original raw time-series data, so there is no averaging, median interpolation, regression, and statistical aggregation. Accordingly, midimax compression avoids statistical manipulations on the underlying data when plotting. For example, the system may receive raw time-series data. The system may determine minimum, median, and maximum points in segments of the raw time-series data. The system may generate a data set based on the minimum, median, and maximum points.

Midimax compression may reduce data sizes such that large time-series plots may be processed quickly and consume fewer computing resources. Furthermore, while conventional compression algorithms may remove data, creating bias, midimax compression maintains general trends rather than small noise. Accordingly, midimax compression may capture the variations in the raw data set using a smaller number of points and to process larger data sets more quickly.

To perform a midimax compression, the system may receive an input of the raw time-series data and a compression factor (e.g., a float number). For example, the system may receive raw time-series data and receive a compression factor. The system may segment the raw time-series data into data segments. For example, the system may split the raw time-series data into non-overlapping segments of equal size where the size is calculated as: segment_size=floor (3*compression factor). By using the compression factor of three, the system determines minimum, median, and maximum values taken from each segment. The system may sort values in each of the data segments. For example, the system may sort the values in each segment in ascending order. The system may select respective minimum and maximum values from the values in each of the data segments. For example, by selecting the first and last values for the min and max values, the system maximizes the variance and retains the most information in the compression. The system may determine a respective median value for each of the data segments based on the respective minimum and maximum values. For example, the system may determine the median by selecting a middle value for the median, where the middle position is defined as med_index=floor(segment_size/2). The system may re-sort the respective median value for each of the data segments. For example, the system may re-sort the selected points by the original index, which may be timestamped.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set using fractal synthesis optimizations. Fractal synthesis may include application of a regularization. For example, the system may receive raw time-series data. The system may generate a data set by applying a fractal synthesis algorithm to the raw time-series data.

For example, regularization is used to reduce an error in a data model by fitting a function appropriately on the given training set and avoiding overfitting. The system may receive raw time-series data. The system may apply a regularization to the raw time-series data to determine a function for the raw time-series data. The system may generate a data set based on the function.

At step 504, process 500 (e.g., using one or more components described above) receives a required future state characteristic. For example, the system may receive a required future state characteristic for the first system state. For example, the "required future state characteristic" may comprise a given rate of return, a total value of the account, etc. for the user account.

At step 506, process 500 (e.g., using one or more components described above) selects a second data set, wherein the second data set comprises second rate-of-change data over a second time period. For example, the system may select a second data set from a plurality of available datasets based on similarities between state characteristics for the second data set and the current state characteristic, and the required future state characteristic, wherein the second data set comprises second rate-of-change data over a second time period. The second data set may comprise account data for another user. The similarities in the state characteristics may include current and future positions, values, expectations, etc. The system may use the similarities to determine a cohort for the first user.

In some embodiments, the system selects a second data set (i.e., non-homogenous data) comprising actual (i.e., not predicted) data, creating a synthetic profile. For example, the actual data found in the synthetic profile comprises second time-series data in which the second time-series data indicates second rates-of-change over a second time period. The system may select the second data set (or a plurality of data sets) based on similarities between the current state characteristics and/or required future state characteristics of the first system at the end of the first time period. The system may then analyze the second data set for predicted events (e.g., a rate of change beyond a threshold).

In some embodiments, the system may use an artificial intelligence model to select a cohort of the user. For example, the system may use a model to select a cohort of the user and then select a data set corresponding to the selected cohort. For example, the system may receive historical time-series data. The system may train a second model using unsupervised learning, wherein the second model comprises a convolutional neural network. The system may select the second data set from the plurality of available datasets using the second model.

At step 508, process 500 (e.g., using one or more components described above) compares the second rate-of-change data to a threshold rate of change. For example, the system may compare the second rate-of-change data to a threshold rate of change to detect a rate-of-change event. For example, the system may detect events in the system state based on large changes in the rate of change of the user account. These large charges may correspond to external events such as a marriage, death, divorce, market downturn, etc.

In some embodiments, the system may determine an edge condition. Edge conditions are data points where the system has determined that a strong correlation exists between two or more other data points. For example, the system may determine an event type for the rate-of-change event. The system may determine the threshold rate based on the event type.

The system may determine based on data about the user that the user is likely to experience an event of a given type. For example, the system may retrieve user profile data. The system may determine the event type based on the user profile data.

At step 510, process 500 (e.g., using one or more components described above) generates a normalized rate-of-change event. For example, the system may generate a normalized rate-of-change event by normalizing the rate-of-change event based on the first data set. For example, the system may normalize the rate-of-change event by time-shifting the date of occurrence, adjusting a magnitude based on inflation, etc.

In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

At step 512, process 500 (e.g., using one or more components described above) inputs the first data set into a first model. For example, the system may input the first data set into a first model to generate first rate-of-change data over a first time period for the first system state. For example, the first model may predict the change in a user's account over a time period without any disruptive events.

In some embodiments, the system may use an artificial intelligence model to determine an effect of a rate-of-change event on a state of a system. For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

At step 514, process 500 (e.g., using one or more components described above) generates modified first rate-of-change data. For example, the system may generate modified first rate-of-change data based on the normalized rate-of-change event. For example, the modified first rate-of-change data may predict the change in a user's account over a time period after applying disruptive events.

At step 516, process 500 (e.g., using one or more components described above) generates a recommendation. For example, the system may generate for display, on a user interface, a recommendation based on the modified first rate-of-change data. For example, the recommendation may include new holdings, positions, investments, etc. to mitigate the disruptive events. In some embodiments, the recommendation may comprise an isobaric graphical representation. Alternatively or additionally, the system recommendation comprises an option to adjust the current state characteristic. For example, the system may recommend that a user adjust one or more current state characteristics to mitigate a detected event.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

FIG. 6 shows a flowchart of the steps involved in generating time-series predictions using artificial intelligence models based on cohort clusters, in accordance with one or more embodiments. For example, process 600 may represent the steps taken by one or more devices as shown herein when generating time-series predictions using artificial intelligence models based on cohort clusters.

At step 602, process 600 (e.g., using one or more components described herein) receives a user profile. For example, the system may receive user profile data via a user interface (e.g., user interface 100 (FIG. 1A)). The system may then determine a likely cohort of the user in order to generate one or more time-series predictions based on that cohort. The user profile may compile data through various forms such as speech commands, textual inputs, and/or responses to system queries, and/or other user profiles. In each case, the system may aggregate information about a current state of the system, information about the user, and/or other circumstances related to the user profile (e.g., time of day, previous user profiles, current account settings, etc.) in order to determine a likely cohort of the user.

At step 604, process 600 (e.g., using one or more components described herein) determines a cohort of a user using artificial intelligence models based on cohort clusters. For example, the methods and systems may include a first artificial intelligence model, wherein the first artificial intelligence model is trained to cluster a plurality of separate time-series data streams into a plurality of cohort clusters (e.g., through unsupervised hierarchical clustering). For example, as opposed to manually grouping potential cohorts, the system may train an artificial intelligence model to identify common user characteristics that correspond to a group of cohorts. Accordingly, the system may generate cohort clusters that provide access to separate time-series data streams and may be represented (e.g., in a user interface) by a single predicted event. The methods and systems may also use a second artificial intelligence model, wherein the second artificial intelligence model is trained to select a subset of the plurality of cohort clusters from the plurality of cohort clusters based on a first feature input, and wherein each cohort cluster of the plurality of cohort clusters corresponds to a respective cohort of users having similar current state characteristics. For example, the system may need to limit the number of predicted events that appear in a given response to those determined to be most relevant and/or most likely to occur to a user.

At step 606, process 600 (e.g., using one or more components described herein) generates a time-series prediction based on the cohort of the user. For example, by using artificial intelligence models based on cohort clusters, the system may also increase the likelihood that cohort clusters provide a correct specific cohort of the user as the system determines only a subset of predicted events and the user selects the predicted event matching his/her cohort. For example, the system may generate a time-series prediction (e.g., as shown in FIGS. 1B-1C) and present the response in a user interface (e.g., as shown in FIGS. 1B-1C). The response may appear with one or more likely responses (e.g., recommendation 152 (FIG. 1D)). In some embodiments, the system may receive a user action selecting (or not selecting) a response (e.g., recommendation 152 (FIG. 1D)) from a user interface.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

FIG. 7 shows a flowchart of the steps involved in using cohort-based predictions in clustered time-series data in order to detect significant rate-of-change events, in accordance with one or more embodiments. For example, process 500 may represent the steps taken by one or more devices as shown herein when generating time-series predictions.

At step 702, process 700 (e.g., using one or more components described herein) receives a user profile. For example, the system may receive a first user profile, wherein the user profile comprises a current state characteristic. In some embodiments, the system may determine one or more user characteristics that are important to determine a cohort of the user. For example, when determining the first feature input based on the first user profile, the system may determine a subset of current state characteristics for generating a first feature input based on the current state characteristic. The system may then populate the first user profile with the subset of state characteristics. The system may, in response to receiving the first user profile, determine a first feature input based on the subset of state characteristics.

In some embodiments, the system may need to determine the values of these characteristics and/or retrieve these user characteristics from a remote location. In such cases, the system may crawl the Internet for data related to one or more characteristics. For example, when populating the first user profile with the subset of state characteristics, the system may crawl the Internet for a remote server comprising the subset of state characteristics. The system may retrieve the subset of state characteristics from the remote server.

In some embodiments, the system may determine one or more user characteristics that are important to determine a cohort of the user based on a user selection. For example, the system may receive, at the user interface, a user selection of the current state characteristic. The system may determine to use the current state characteristic for the first feature input based on the first feature input.

At step 704, process 700 (e.g., using one or more components described herein) determines a feature input based on the first user profile. For example, the system may determine a first feature input based on the first user profile in response to receiving the first user profile. In some embodiments, the first feature input may be a conversational detail or information from a user account of the user. In some embodiments, the first feature input may be based on a current state of a system at the time that the user interface (e.g., user interface 100 (FIG. 1A)) was launched.

At step 706, process 700 (e.g., using one or more components described herein) retrieves a plurality of cohort clusters. For example, the system may retrieve a plurality of cohort clusters, wherein the plurality of cohort clusters is generated by a first artificial intelligence model that is trained to cluster a plurality of separate time-series data streams into the plurality of cohort clusters through unsupervised hierarchical clustering. For example, in some embodiments, the first artificial intelligence model is trained to cluster the plurality of separate time-series data streams into the plurality of cohort clusters through unsupervised hierarchical clustering into hierarchies of correlation-distances between separate time-series data streams. For example, the system may generate a matrix of pairwise correlations corresponding to the plurality of separate time-series data streams and cluster the plurality of separate time-series data streams based on pairwise distances.

For example, in some embodiments, the system may receive a first labeled feature input, wherein the first labeled feature input is labeled with a known cohort cluster for the first labeled feature input, and train the second artificial intelligence model to classify the first labeled feature input with the known cohort cluster.

At step 708, process 700 (e.g., using one or more components described herein) inputs the first feature input into an artificial intelligence model. For example, the system may input the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having similar current state characteristics. In some embodiments, the system may select the second artificial intelligence model, from a plurality of artificial intelligence models, based on the plurality of cohort clusters that are retrieved. For example, the system may select different second artificial intelligence models based on the number and/or configuration of the cohort clusters. For example, the system may determine that some artificial intelligence models may be better suited for selecting a subset of the cohort clusters.

In some embodiments, the system may select the subset of the plurality of cohort clusters based on a screen size of a device generating the user interface. For example, the system may determine, based on the time period, model type, device type upon which a user interface is accessed, and/or format, a number, length, or size of a time-series prediction and/or predicted event in a time-series prediction.

At step 710, process 700 (e.g., using one or more components described herein) receives an output from the artificial intelligence model. For example, the system may receive an output from the second artificial intelligence model.

At step 712, process 700 (e.g., using one or more components described herein) selects a time-series prediction. For example, the system may select, based on the output, a time-series prediction from a plurality of time-series predictions, wherein each of the plurality of time-series predictions comprises a respective predicted event, and wherein each cohort cluster of the subset of the plurality of cohort clusters corresponds to a respective cohort of users having similar current state characteristics.

At step 714, process 700 (e.g., using one or more components described above) generates the time-series prediction. For example, the system may generate, at the user interface, the time-series prediction. In some embodiments, the time-series prediction may be displayed in a textual, graphical, and/or mix thereof (e.g., as shown in user interface 140 (FIG. 1C)). For example, the system may generate an isobaric representation of the time-series prediction (e.g., graph 116 (FIG. 1B)). The system may identify a predicted event (e.g., pressure point 112 (FIG. 1B)) for the time-series prediction in the isobaric representation. Additionally or alternatively, the system may generate an option (e.g., recommendation 152 (FIG. 1D)) to modify the current state characteristic based on the predicted event.

In some embodiments, the system may determine a gradient for the time-series prediction. For example, the gradient of a scalar-valued differentiable function (f) of several variables is the vector field (or vector-valued function) whose value at a point (p) is the direction and rate of fastest increase. For example, the system may determine a gradient for the time-series prediction. The system may determine a magnitude of the gradient. The system may identify a predicted event for the time-series prediction based on the magnitude. For example, the time-series prediction may be represented in an isobaric graph. The system may then process the isobaric graph to determine one or more predicted events. These predicted events may comprise a local maximum or local minima of the isobaric graph. For example, if the gradient of a function is non-zero at a point (p), the direction of the gradient is the direction in which the function increases most quickly from (p), and the magnitude of the gradient is the rate of increase in that direction, the greatest absolute directional derivative. The system may determine a point in the isobaric graph in which point (p) equals zero (e.g., representing a local minimum or local maximum). For example, a point on a graph (or its associated function) whose value is less than all other points near it is a local minimum, whereas a point on a graph (or its associated function) whose value is greater than all other points near it is a local maximum. The system may detect local minimums and maximums to identify a predicted event.

Additionally or alternatively, the system may determine the severity of a predicted event based on the magnitude of the gradient. For example, the magnitude of the gradient is the rate of increase in that direction. This rate may be positive or negative. Furthermore, the larger the magnitude (e.g., the absolute value of the magnitude), the greater the effect on the system state and/or a characteristic thereof. For example, based on the magnitude (and whether it is positive or negative), the system may represent a windfall event or a personal or financial emergency that negatively affects the financial projection. For example, the system may determine an effect of the predicted event based on the magnitude. The system may generate a user recommendation based on the effect.

In some embodiments, the system may perform isotropic scaling on the time-series prediction to identify a predicted event. For example, isotropic scaling is a linear transformation that enlarges (increases) or shrinks (diminishes) objects by a scale factor that is the same in all directions. In some embodiments, the system may perform non-uniform scaling (anisotropic scaling) which is obtained when at least one of the scaling factors is different from the others. For example, the system may determine a scale factor for the time-series prediction. The system may perform, based on the scale factor, a linear transformation to the time-series prediction to identify a predicted event for the time-series prediction.

In some embodiments, the system may receive a second user profile. In response to receiving the second user profile, the system may determine a second feature input for the second artificial intelligence model based on the second user profile. The system may input the second feature input into the second artificial intelligence model. The system may receive a different output from the second artificial intelligence model. The system may select, based on the different output, a different time-series prediction from the plurality of time-series predictions that corresponds to a different subset of the plurality of cohort clusters.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method for responding to predicted events in computer systems based on outlier events in time-series data using artificial intelligence models trained on non-homogenous time-series data.
2. The method of any one of the preceding embodiments, further comprising: receiving a first data set comprising a current state characteristic for a first system state; receiving a required future state characteristic for the first system state; selecting a second data set from a plurality of available datasets based on similarities between state characteristics for the second data set and the current state characteristic and the required future state characteristic, wherein the second data set comprises second rate-of-change data over a second time period; comparing the second rate-of-change data to a threshold rate of change to detect a rate-of-change event; generating a normalized rate-of-change event by normalizing the rate-of-change event based on the first data set; inputting the first data set into a first model to generate first rate-of-change data over a first time period for the first system state; generating modified first rate-of-change data based on the normalized rate-of-change event; and generating for display, on a user interface, a recommendation based on the modified first rate-of-change data.

3. The method of any one of the preceding embodiments, further comprising: receiving a raw time-series data; and generating the second data by applying a compression algorithm to the raw time-series data.

4. The method of any one of the preceding embodiments, further comprising: receiving a raw time-series data; determining minimum, median, and maximum points in segments of the raw time-series data; and generating the second data based on the minimum, median, and maximum points.

5. The method of any one of the preceding embodiments, further comprising: receiving a raw time-series data; receiving a compression factor; segmenting the raw time-series data into data segments; sorting values in each of the data segments; selecting respective minimum and maximum values from the values in each of the data segments; determining a respective median value for each of the data segments based on the respective minimum and maximum values; and re-sorting the respective median value for each of the data segments.

6. The method of any one of the preceding embodiments, further comprising: receiving a raw time-series data; and generating the second data by applying a fractal synthesis algorithm to the raw time-series data.

7. The method of any one of the preceding embodiments, further comprising: receiving a raw time-series data; applying a regularization to the raw time-series data to determine a function for the raw time-series data; and generating the second data based on the function.

8. The method of any one of the preceding embodiments, further comprising: receiving historical time-series data; training a second model using unsupervised learning, wherein the second model comprises a convolutional neural network; and selecting the second data set from the plurality of available datasets using the second model.

9. The method of any one of the preceding embodiments, further comprising: receiving historical time-series data; training the first model using unsupervised learning, wherein the first model comprises a convolutional neural network; and selecting the recommendation from a plurality of recommendations based on an output of the first model.

10. The method of any one of the preceding embodiments, wherein generating the normalized rate-of-change event by normalizing the rate-of-change event based on the first data set further comprises: determining a first start time corresponding to the first time period; determining a second start time corresponding to the second time period; determining a difference between the second start time and a time of the rate-of-change event; and applying the difference to the first start time to determine a predicted time of the rate-of-change event during the first time period.

11. The method of any one of the preceding embodiments, wherein the recommendation comprises an isobaric graphical representation.

12. The method of any one of the preceding embodiments, further comprising: determining an event type for the rate-of-change event; and determining the threshold rate based on the event type.

13. The method of any one of the preceding embodiments, further comprising: retrieving user profile data; and determining the event type based on the user profile data.

14. The method of any one of the preceding embodiments, wherein the recommendation comprises an option to adjust the current state characteristic.

15. A method for using cohort-based predictions in clustered time-series data in order to detect significant rate-of-change events.

16. The method of any one of the preceding embodiments, further comprising: receiving a first user profile, wherein the user profile comprises a current state characteristic; in response to receiving the first user profile, determining a first feature input based on the first user profile; retrieving a plurality of cohort clusters, wherein the plurality of cohort clusters is generated by a first artificial intelligence model that is trained to cluster a plurality of separate time-series data streams into the plurality of cohort clusters; inputting the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having similar current state characteristics; receiving an output from the second artificial intelligence model; selecting, based on the output a time-series prediction from a plurality of time-series predictions, wherein each of the plurality of time-series predictions comprises a respective predicted event, and wherein each cohort cluster of the subset of the plurality of cohort clusters corresponds to a respective time-series prediction of the plurality of time-series predictions; and generating, at a user interface, the time-series prediction.

17. The method of any one of the preceding embodiments, wherein determining the first feature input based on the first user profile comprises: determining a subset of current state characteristics for generating a first feature input based on the current state characteristic; populating the first user profile with the subset of state characteristics; and in response to receiving the first user profile, determining a first feature input based on the subset of state characteristics.

18. The method of any one of the preceding embodiments, wherein populating the first user profile with the subset of state characteristics further comprises: crawling the Internet for a remote server comprising the subset of state characteristics; and retrieving the subset of state characteristics from the remote server.

19. The method of any one of the preceding embodiments, wherein determining the first feature input based on the first user profile further comprises: receiving, at the user interface, a user selection of the current state characteristic; and determining to use the current state characteristic for the first feature input based on the first feature input.

20. The method of any one of the preceding embodiments, further comprising: receiving a second user profile; in response to receiving the second user profile, determining a second feature input for the second artificial intelligence model based on the second user profile; inputting the second feature input into the second artificial intelligence model; receiving a different output from the second artificial intelligence model; and selecting, based on the different output, a different time-series prediction from the plurality of time-series predictions that corresponds to a different subset of the plurality of cohort clusters.

21. The method of any one of the preceding embodiments, wherein generating the time-series prediction further comprises: determining a gradient for the time-series prediction; determining a magnitude of the gradient; and identifying a predicted event for the time-series prediction based on the magnitude.

22. The method of any one of the preceding embodiments, further comprising: determining an effect of the predicted event based on the magnitude; and generating a user recommendation based on the effect.

23. The method of any one of the preceding embodiments, wherein generating the time-series prediction further comprises: determining a scale factor for the time-series prediction; and performing, based on the scale factor, a linear transformation to the time-series prediction to identify a predicted event for the time-series prediction.

24. The method of any one of the preceding embodiments, wherein the first artificial intelligence model is trained to cluster the plurality of separate time-series data streams into the plurality of cohort clusters through unsupervised hierarchical clustering into hierarchies of correlation-distances between separate time-series data streams.

25. The method of any one of the preceding embodiments, wherein training the first artificial intelligence model comprises: generating a matrix of pairwise correlations corresponding to the plurality of separate time-series data streams; and clustering the plurality of separate time-series data streams based on pairwise distances.

26. The method of any one of the preceding embodiments, further comprising: receiving a first labeled feature input, wherein the first labeled feature input is labeled with a known cohort cluster for the first labeled feature input; and training the second artificial intelligence model to classify the first labeled feature input with the known cohort cluster.

27. The method of any one of the preceding embodiments, wherein generating the time-series prediction further comprises: generating an isobaric representation of the time-series prediction; and identifying a predicted event for the time-series prediction in the isobaric representation.

28. The method of any one of the preceding embodiments, wherein generating the time-series prediction further comprises: identifying a predicted event for the time-series prediction; and generating an option to modify the current state characteristic based on the predicted event.

29. A tangible, non-transitory, machine-readable medium storing instructions that, when executed by a data processing apparatus, cause the data processing apparatus to perform operations comprising those of any of embodiments 1-28.

30. A system comprising one or more processors; and memory-storing instructions that, when executed by the processors, cause the processors to effectuate operations comprising those of any of embodiments 1-28.

31. A system comprising means for performing any of embodiments 1-28.

What is claimed is:

1. A system for using cohort-based predictions in clustered time-series data in order to detect rate-of-change events, the system comprising:
one or more processors; and
a non-transitory, computer-readable medium comprising instructions recorded thereon that when executed by the one or more processors cause operations comprising:
generating historical time-series training data that indicates historic rates-of-change over given time periods;
receiving, at a user interface of a client portal, a request for a time-series prediction;
receiving a first user profile for a first user, wherein the first user profile comprises a current state characteristic, wherein the first user profile comprises a digital representation associated with an identity of the first user;
determining a subset of state characteristics for generating a first feature input based on the current state characteristic, wherein the first feature input comprises a vector array of values;
populating the first user profile with the subset of state characteristics;
in response to receiving the first user profile, determining the first feature input based on the subset of state characteristics;
retrieving a plurality of cohort clusters, wherein the plurality of cohort clusters is generated by a first artificial intelligence model that is trained to cluster a plurality of separate time-series data streams into the plurality of cohort clusters through unsupervised hierarchical clustering, and wherein data in each of the plurality of separate time-series data streams is cleansed by reformatting or standardizing data prior to clustering the data to into the plurality of cohort clusters;
inputting the first feature input into a second artificial intelligence model, wherein the second artificial intelligence model is trained to select a subset of the plurality of cohort clusters from the plurality of cohort clusters based on the first feature input, and wherein each cohort cluster of the plurality of cohort clusters corresponds to a respective cohort of users having current state characteristics, and wherein training the second artificial intelligence model comprises training a convolutional neural network using unsupervised learning on the historical time-series training data;
receiving an output from the second artificial intelligence model; and
generating, based on the output, a synthetic profile for the first user comprising the time-series prediction, wherein the synthetic profile comprises historic time-series data corresponding to the subset of the plurality of cohort clusters.

2. A method for using cohort-based predictions in clustered time-series data in order to detect rate-of-change events, the method comprising:
generating historical time-series training data that indicates historic rates-of-change over given time periods;
receiving a first user profile for a first user, wherein the first user profile comprises a current state characteristic, and wherein the first user profile comprises a digital representation associated with an identity of a first user;

in response to receiving the first user profile, determining a first feature input based on the first user profile, wherein the first feature input comprises a vector array of values;

retrieving a plurality of cohort clusters, wherein the plurality of cohort clusters is generated by a first artificial intelligence model that is trained to cluster a plurality of separate time-series data streams into the plurality of cohort clusters, wherein data in each of the plurality of separate time-series data streams is cleansed by reformatting or standardizing data prior to clustering the data to into the plurality of cohort clusters;

inputting the first feature input into a second artificial intelligence model, wherein the second artificial intelligence model is trained to select a subset of the plurality of cohort clusters from the plurality of cohort clusters based on the first feature input, wherein each cohort cluster of the plurality of cohort clusters corresponds to a respective cohort of users having current state characteristics, and wherein training the second artificial intelligence model comprises training a convolutional neural network using unsupervised learning on the historical time-series training data;

receiving an output from the second artificial intelligence model; and generating, based on the output, a synthetic profile for the first user, wherein the synthetic profile comprises a time-series prediction.

3. The method of claim 2, wherein determining the first feature input based on the first user profile comprises:
determining a subset of current state characteristics for generating a first feature input based on the current state characteristic;
populating the first user profile with the subset; and
in response to receiving the first user profile, determining the first feature input based on the subset.

4. The method of claim 3, wherein populating the first user profile with the subset further comprises:
crawling the Internet for a remote server comprising the subset; and
retrieving the subset from the remote server.

5. The method of claim 2, wherein determining the first feature input based on the first user profile further comprises:
receiving a user selection of the current state characteristic; and
determining to use the current state characteristic for the first feature input based on the first feature input.

6. The method of claim 2, further comprising:
receiving a second user profile;
in response to receiving the second user profile, determining a second feature input for the second artificial intelligence model based on the second user profile;
inputting the second feature input into the second artificial intelligence model;
receiving a different output from the second artificial intelligence model; and
selecting, based on the different output, a different time-series prediction.

7. The method of claim 2, wherein generating the time-series prediction further comprises:
determining a gradient for the time-series prediction;
determining a magnitude of the gradient; and
identifying a predicted event for the time-series prediction based on the magnitude.

8. The method of claim 7, further comprising:
determining an effect of the predicted event based on the magnitude; and
generating a user recommendation based on the effect.

9. The method of claim 2, wherein generating the time-series prediction further comprises:
determining a scale factor for the time-series prediction; and
performing, based on the scale factor, a linear transformation to the time-series prediction to identify a predicted event for the time-series prediction.

10. The method of claim 2, wherein the first artificial intelligence model is trained to cluster the plurality of separate time-series data streams into the plurality of cohort clusters through unsupervised hierarchical clustering into hierarchies of correlation-distances between separate time-series data streams.

11. The method of claim 2, wherein training the first artificial intelligence model comprises:
generating a matrix of pairwise correlations corresponding to the plurality of separate time-series data streams; and
clustering the plurality of separate time-series data streams based on pairwise distances.

12. The method of claim 2, further comprising:
receiving a first labeled feature input, wherein the first labeled feature input is labeled with a known cohort cluster for the first labeled feature input; and
training the second artificial intelligence model to classify the first labeled feature input with the known cohort cluster.

13. The method of claim 2, wherein generating the time-series prediction further comprises:
generating an isobaric representation of the time-series prediction; and
identifying a predicted event for the time-series prediction in the isobaric representation.

14. The method of claim 2, wherein generating the time-series prediction further comprises:
identifying a predicted event for the time-series prediction; and
generating an option to modify the current state characteristic based on the predicted event.

15. A non-transitory, machine-readable medium for using cohort-based predictions in clustered time-series data in order to detect rate-of-change events, comprising instructions that, when executed by one or more processors, cause operations comprising:
generating historical time-series training data that indicates historic rates-of-change over given time periods;
receiving a first user profile, wherein the first user profile comprises a digital representation associated with an identity of a first user;
in response to receiving the first user profile, determining a first feature input based on the first user profile, wherein the first feature input comprises a vector array of values;
retrieving a plurality of cohort clusters, wherein the plurality of cohort clusters is generated by a first artificial intelligence model that is trained to cluster a plurality of separate time-series data streams into the plurality of cohort clusters, and wherein data in each of the plurality of separate time-series data streams is cleansed by reformatting or standardizing data prior to clustering the data to into the plurality of cohort clusters;

inputting the first feature input into a second artificial intelligence model, wherein the second artificial intelligence model is trained to select a subset of the plurality of cohort clusters from the plurality of cohort clusters based on the first feature input, wherein each cohort cluster of the plurality of cohort clusters corresponds to a respective cohort of users having current state characteristics, and wherein training the second artificial intelligence model comprises training a convolutional neural network using unsupervised learning on the historical time-series training data;

receiving an output from the second artificial intelligence model;

generating, based on the output, an isobaric representation of a time-series prediction, wherein the isobaric representation is based on historic time-series data corresponding to the subset of the plurality of cohort clusters; and identifying a predicted event for the time-series prediction in the isobaric representation.

16. The non-transitory, machine-readable medium of claim 15, wherein determining the first feature input based on the first user profile comprises:
    determining a subset of current state characteristics for generating a first feature input;
    populating the first user profile with the subset; and
    in response to receiving the first user profile, determining the first feature input based on the subset.

17. The non-transitory, machine-readable medium of claim 16, wherein populating the first user profile with the subset further comprises:
    crawling the Internet for a remote server comprising the subset; and
    retrieving the subset from the remote server.

18. The non-transitory, machine-readable medium of claim 15, wherein determining the first feature input based on the first user profile further comprises:
    receiving a user selection of a current state characteristic; and
    determining to use the current state characteristic for the first feature input based on the first feature input.

19. The non-transitory, machine-readable medium of claim 15, wherein generating the time-series prediction further comprises:
    determining a gradient for the time-series prediction;
    determining a magnitude of the gradient; and
    identifying a predicted event for the time-series prediction based on the magnitude.

20. The non-transitory, machine-readable medium of claim 19, wherein the instructions further cause operations comprising:
    determining an effect of the predicted event based on the magnitude; and
    generating a user recommendation based on the effect.

* * * * *